United States Patent
Quan et al.

(10) Patent No.: US 12,517,650 B2
(45) Date of Patent: Jan. 6, 2026

(54) DISPLAY CONTROL METHOD, ELECTRONIC DEVICE, AND READABLE STORAGE MEDIUM

(71) Applicant: Honor Device Co., Ltd., Shenzhen (CN)

(72) Inventors: Ruilin Quan, Shenzhen (CN); Long Wang, Shenzhen (CN); Ben Huang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 281 days.

(21) Appl. No.: 18/553,122

(22) PCT Filed: Dec. 28, 2022

(86) PCT No.: PCT/CN2022/142750
§ 371 (c)(1),
(2) Date: Sep. 28, 2023

(87) PCT Pub. No.: WO2023/131022
PCT Pub. Date: Jul. 13, 2023

(65) Prior Publication Data
US 2024/0184443 A1 Jun. 6, 2024

(30) Foreign Application Priority Data
Jan. 4, 2022 (CN) .......................... 202210003211.5

(51) Int. Cl.
*G06F 3/048* (2013.01)
*G06F 3/04842* (2022.01)
(Continued)

(52) U.S. Cl.
CPC ...... *G06F 3/04883* (2013.01); *G06F 3/04842* (2013.01); *G06F 3/04845* (2013.01);
(Continued)

(58) Field of Classification Search
CPC ............. G06F 3/04883; G06F 3/04842; G06F 3/04845; G06F 2203/04803; G06F 2203/04806
See application file for complete search history.

(56) References Cited

U.S. PATENT DOCUMENTS

| 9,721,187 B2 | 8/2017 | Cook |
| 10,698,588 B2 | 6/2020 | Price et al. |

(Continued)

FOREIGN PATENT DOCUMENTS

| CN | 103885696 A | 6/2014 |
| CN | 104360808 A | 2/2015 |

(Continued)

OTHER PUBLICATIONS

Andy and Richo—Digital Innovation for Education, "OneNote Student Guide—Lasso Tool on Apple iPad," Retrieved from the Internet, URL: https://www.youtube.com/watch?v=WfN8-1092ZM (Aug. 19, 2021).

(Continued)

*Primary Examiner* — Mahelet Shiberou
(74) *Attorney, Agent, or Firm* — Leydig, Voit & Mayer, Ltd.

(57) ABSTRACT

This application relates to the field of smart terminal technologies, and specifically, to a display control method, an electronic device, and a readable storage medium. The method includes: The electronic device displays a first interface, where the first interface includes a first window of a first application; in response to a first operation of a user on the first interface, displays a first trajectory corresponding to the first operation, where the first trajectory surrounds at least a part of a first target; in response to ending the first operation by the user, converts the first trajectory into a second trajectory, displays the second trajectory, and displays a first control on the second trajectory, where the second trajectory is determined based on an edge of the first target, and the first target is located in the second trajectory.

20 Claims, 21 Drawing Sheets

(51) Int. Cl.
  *G06F 3/04845*  (2022.01)
  *G06F 3/04883*  (2022.01)
(52) U.S. Cl.
  CPC .............. *G06F 2203/04803* (2013.01); *G06F 2203/04806* (2013.01)

(56) References Cited

U.S. PATENT DOCUMENTS

2012/0026100 A1\* 2/2012 Migos ................... G06F 3/0412
                                                        345/173
2018/0335932 A1\* 11/2018 Ta ....................... G06F 3/04883

FOREIGN PATENT DOCUMENTS

| | | |
|---|---|---|
| CN | 111324261 A | 6/2020 |
| CN | 112639713 A | 4/2021 |
| WO | 2015074507 A1 | 5/2015 |
| WO | 2020133386 A1 | 7/2020 |

OTHER PUBLICATIONS

Apple Support, "How to multitask with Split View on iPad | Apple Support," Retrieved from the Internet, URL: https://www.youtube.com/watch?v=YbaiZS_G2a4 (Oct. 11, 2021).

\* cited by examiner

DISPLAY CONTROL METHOD, ELECTRONIC DEVICE, AND READABLE STORAGE MEDIUM

CROSS-REFERENCE TO RELATED APPLICATIONS

This application is a National Stage of International Application No. PCT/CN2022/142750, filed on Dec. 28, 2022, which claims priority to Chinese Patent Application No. 202210003211.5, filed on Jan. 4, 2022, both of which are hereby incorporated by reference in their entireties.

TECHNICAL FIELD

This application relates to the field of smart terminal technologies, and specifically, to a display control method, an electronic device, and a readable storage medium.

BACKGROUND

With development of smart terminal technologies, a terminal electronic device performing display control by relying on a mouse, a touch control screen, or the like usually includes an application that can perform document processing, for example, a memo, an electronic document, electronic graphics processing software, or note-taking software. In these applications, a user may box-select a desired target area by himself/herself, and may control the box-selected target area through display control to change, for example, move, zoom, or rotate.

SUMMARY

Embodiments of this application provide a display control method, an electronic device, and a readable storage medium, which can improve visual perception of a user and help improve user experience.

According to a first aspect, this application provides a display control method, including: An electronic device displays a first interface, where the first interface includes a first window of a first application: in response to a first operation of a user on the first interface, displays a first trajectory corresponding to the first operation, where the first trajectory surrounds at least a part of a first target: in response to ending the first operation by the user, converts the first trajectory into a second trajectory, displays the second trajectory, and displays a first control on the second trajectory, where the second trajectory is determined based on an edge of the first target, and the first target is located in the second trajectory: and in response to a second operation performed by the user on the first control on the first interface, simultaneously changes the second trajectory and the first target in the second trajectory.

It may be understood that the first operation is a box selection operation of the user in a box selection mode, and the first trajectory is a box selection trajectory displayed by the electronic device on a screen of the electronic device corresponding to the box selection operation. The second trajectory is a lasso trajectory that is generated by the electronic device based on the box selection trajectory when detecting that the user ends the box selection operation. It may be understood that the first target is a target area in which the user wants to make changes (which are hereinafter referred to as transformation) such as movement and rotation, and the first control is a key handle that can control the target area to transform.

It may be understood that the second gesture operation is a control operation of the user. In some embodiments, the control operation is a touch sliding operation for controlling the first target to perform movement transformation, a touch sliding operation for controlling the first target to perform zoom transformation, a touch sliding operation for controlling the first target to perform rotation transformation, or the like.

According to the display control method provided in an embodiment of this application, the key handle can be determined on the lasso trajectory on a visual interface of the electronic device. In addition, in different control scenarios of the electronic device, relative locations and relative sizes of the key handle and the lasso trajectory remain unchanged, so that the key handle is attached to the lasso trajectory. In addition, stability of the key handle in different scenarios is ensured, which can improve visual perception of the user, and help improve user experience.

In a possible implementation of the first aspect, changing includes at least one of zoom transformation, translation transformation, and rotation transformation.

In a possible implementation of the first aspect, the method further includes that in a process of changing the second trajectory, the first control is stationary relative to the second trajectory.

It may be understood that when the second gesture operation is performed, the first control, the first target, and the second trajectory simultaneously change, and relative locations of the first control, the first target, and the second trajectory remain unchanged.

In a possible implementation of the first aspect, a display location of the first control on the second trajectory is a first intersection point of a first connection line and the second trajectory, the first connection line is a straight line connecting a center point of the second trajectory and a start point of the first trajectory, and the first intersection point is an intersection point that is closest to the start point of the first trajectory and that is in intersection points of the first connection line and the second trajectory.

It may be understood that, in some embodiments, the first intersection point is the intersection point that is closest to the center point of the second trajectory and that is searched in the intersection points of the first connection line and the second trajectory.

In a possible implementation of the first aspect, a display location of the first control on the second trajectory is a second intersection point of a second connection line and the second trajectory; the second connection line is a straight line connecting a center point of the second trajectory and an end point of the first trajectory, and the second intersection point is an intersection point that is closest to the end point of the first trajectory and that is in intersection points of the second connection line and the second trajectory.

It may be understood that, in some embodiments, the second intersection point is the intersection point that is closest to the center point of the second trajectory and that is searched in the intersection points of the second connection line and the second trajectory.

In a possible implementation of the first aspect, the method further includes: changing from the first interface to a second interface in response to a third operation of the user on the first interface, where the second interface includes a second window; the second window is generated by adjusting the first window based on a display percentage, and the second window displays a second target, a third trajectory, and a second control.

In some embodiments, the third operation may be an operation of enabling a split-screen window mode by the user on the first interface of the electronic device, and the second window and a third window may be displayed in the split-screen window mode. In some embodiments, the third operation may be an operation of enabling a floating window mode by the user on the first interface of the electronic device, and the second window or a third window may be displayed in the floating window mode.

In a possible implementation of the first aspect, the second target, the third trajectory, and the second control are generated by adjusting the first target, the second trajectory, and the first control based on the display percentage, and relative locations of the second target, the third trajectory, and the second control remain unchanged.

It may be understood that, after the third operation of the user is detected, in a process in which the first window is changed into the second window; the relative locations of the key handle, the lasso trajectory, and the target area remain unchanged, and only the display percentage is adjusted.

In a possible implementation of the first aspect, the third operation includes a split-screen operation or a floating window operation.

In a possible implementation of the first aspect, the second interface further includes a third window; and the method further includes: in response to a fourth operation of the user in the second window; simultaneously changing the second control, the third trajectory, and the second target in the third trajectory, where the third window remains stationary.

It may be understood that the fourth operation may include a rotation operation, a zoom transformation operation, and a translation operation. The third window and the second window may be different window interfaces of a same application, for example, are memo windows. In addition, the third window also includes a key handle, a lasso trajectory, and a target area corresponding to the lasso trajectory: When the user performs, in the second window; the fourth operation, for example, the rotation operation, the zoom transformation operation, and the translation operation, the key handle, the lasso trajectory, and the target area corresponding to the lasso trajectory that are in the second window may be changed, but the key handle, the lasso trajectory, and the target area corresponding to the lasso trajectory that are in the third window do not follow the fourth operation of the user to change.

In a possible implementation of the first aspect, the first application includes a memo, an electronic note application, an electronic document application, or an electronic graphics processing application.

In a possible implementation of the first aspect, the first application is a memo and a lasso tool on the first interface is in an enabled state. It may be understood that, that the lasso tool on the first interface is in the enabled state is that the memo in the electronic device is in the box selection mode.

According to a second aspect, an embodiment of this application provides an electronic device, including one or more processors and one or more memories. The one or more memories store one or more programs, and when the one or more programs are executed by the one or more processors, the electronic device is enabled to perform the display control method.

According to a third aspect, an embodiment of this application provides a computer-readable storage medium. The storage medium stores instructions, and when the instructions are executed by a computer, the computer is enabled to perform the display control method.

According to a fourth aspect, an embodiment of this application provides a computer program product, including a computer program/instructions. When the computer program/instructions are executed by a processor, the display control method is implemented.

DESCRIPTION OF EMBODIMENTS

Figure 1A:
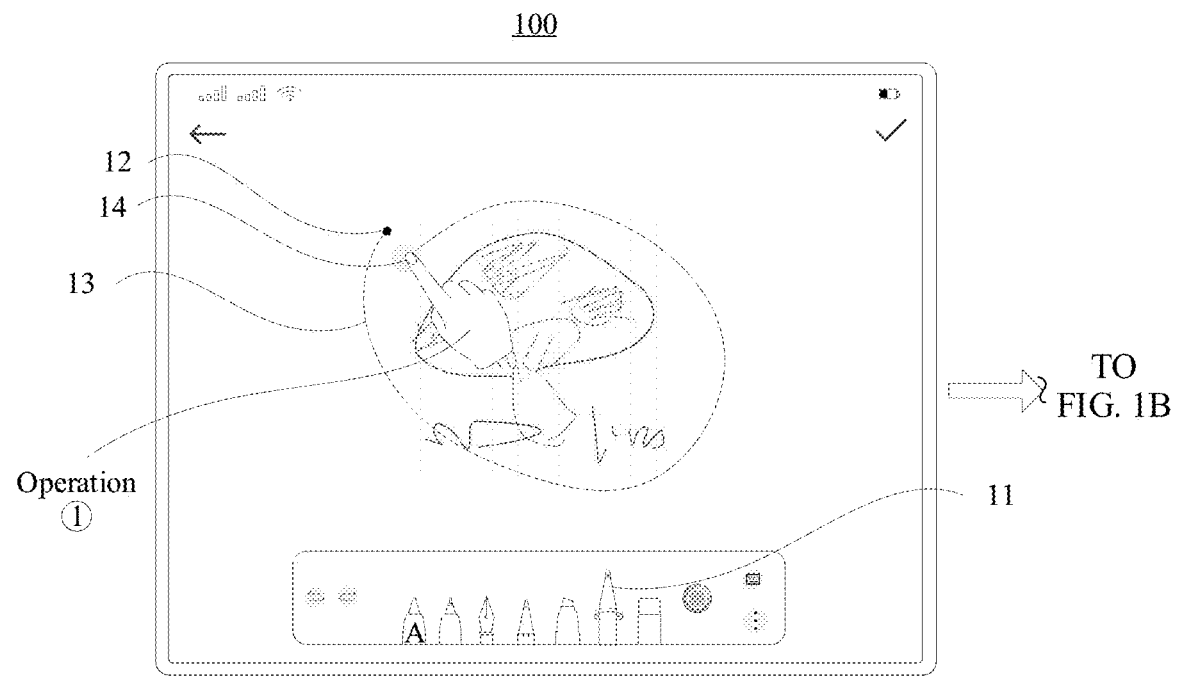
FIG. 1A and FIG. 1B are schematic diagrams of interfaces in an operation process of a display control method.
Figure 1B:
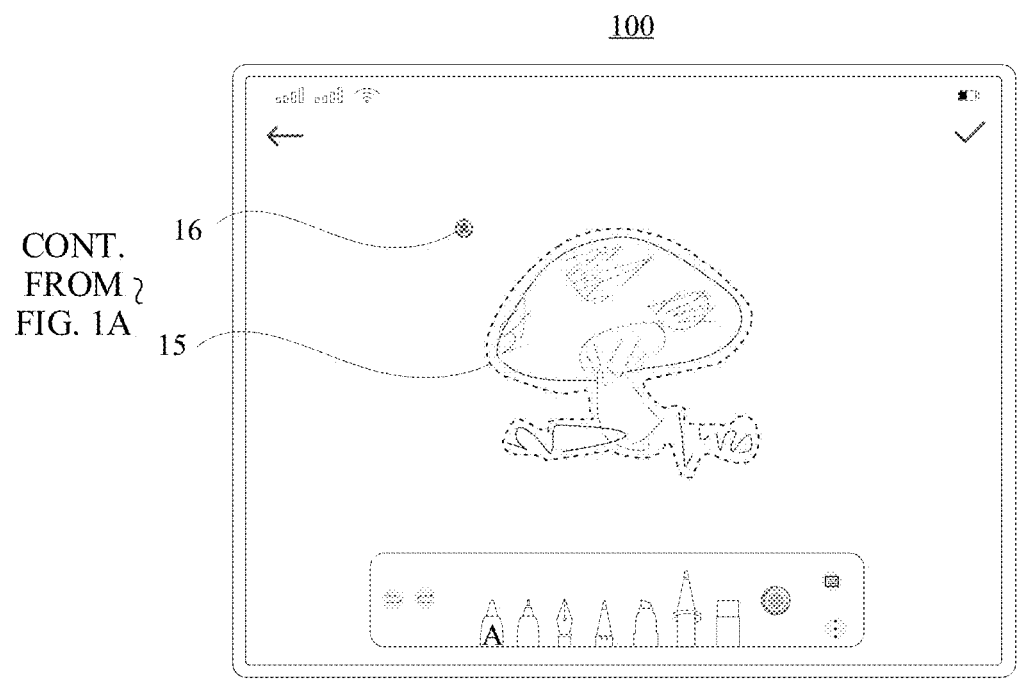

Referring to FIG. 1A and FIG. 1B, a process in which the user operates a tablet computer 100 in a memo to box-select a target area may be shown in an operation 1 in FIG. 1A. First, the user taps a lasso tool 11 on a display interface of the tablet computer 100, and then starts to box-select the target area from a start point location 12 to an end point location 14. In a process in which the user performs the operation (1), the tablet computer 100 responds in real time to a box selection operation of the user, to form a corresponding box selection trajectory 13. In this case, the tablet computer 100 may display an interface as shown in FIG. 1A. As shown in FIG. 1A, the target area is included in the box selection trajectory 13.

When a finger of the user leaves a touch control screen, the tablet computer 100 detects that the user completes the box selection operation, generates a key handle 16 at the start point location 12 of the box selection trajectory 13, and adjusts the box selection trajectory 13 based on the target area in an area box-selected by the box selection trajectory 13 to enable the box selection trajectory 13 match an outer contour of the target area, to obtain a lasso trajectory 15, and the box selection trajectory 13 disappears, as shown in FIG. 1B. The user may operate the key handle 16 to complete zooming, rotating, and the like of the target area.

It can be learned that the key handle 16 is separated from the lasso trajectory 15 and the box-selected target area, and the key handle 16 cannot be attached to the lasso trajectory 15 and the box-selected target area. This relatively affects visual perception of the user. In particular, after the user operates the key handle 16 to zoom-in, the target area is still on an interface displayed on the tablet computer 100, but the key handle 16 leaves the interface displayed on the tablet computer 100. When the target area needs to be zoomed out, the user needs to drag a canvas to display the key handle 16. Operations are relatively cumbersome, which ultimately causes poor user experience.

To resolve the foregoing problem that user experience is poor due to separation of a key handle from a lasso trajectory and a target area after a user box-selects the target area on a touch control screen of an electronic device such as a tablet computer, an embodiment of this application provides a display control method. Specifically, in the method, location coordinates of a box selection trajectory and the lasso trajectory are collected, a point is determined on the lasso trajectory on a display interface of the electronic device, a location corresponding to the point is displayed as the key handle, and the user further completes transformation to the target area based on the key handle on the display interface. For example, a location determining manner of the key handle may be determining based on an intersection point of the lasso trajectory and a line connecting a start point or an end point of the box selection trajectory to a center point of the target area. In addition, when the target area is controlled to change, or a location and a size of a display window of an application corresponding to the target area are changed, relative locations and relative sizes of the key handle and the lasso trajectory remain unchanged.

In this way, according to the display control method provided in this embodiment of this application, the key handle can be determined on the lasso trajectory on a visual interface of the electronic device. In addition, in different control scenarios of the electronic device, the relative locations and the relative sizes of the key handle and the lasso trajectory remain unchanged, so that the key handle is attached to the lasso trajectory. In addition, stability of the key handle in different scenarios is ensured, which can improve visual perception of the user, and help improve user experience.

It may be understood that the box selection trajectory is an operation trajectory displayed by the electronic device in response to a box selection operation of the user. The box selection operation is an operation performed by the user on to-be-box-selected target area on the touch control screen of the electronic device. The lasso trajectory is a trajectory that is generated by the electronic device based on the box selection trajectory drawn by the user and the target area box-selected by the box selection trajectory and that matches an outer contour of the target area.

It may be understood that the key handle may be operated by the user to control the target area in the lasso trajectory to change. For example, when the user drags the key handle to slide, the electronic device may control the target area to perform zoom transformation. For example, when the user drags the key handle to rotate, the electronic device may control the target area to perform rotation transformation.

Figure 2A:
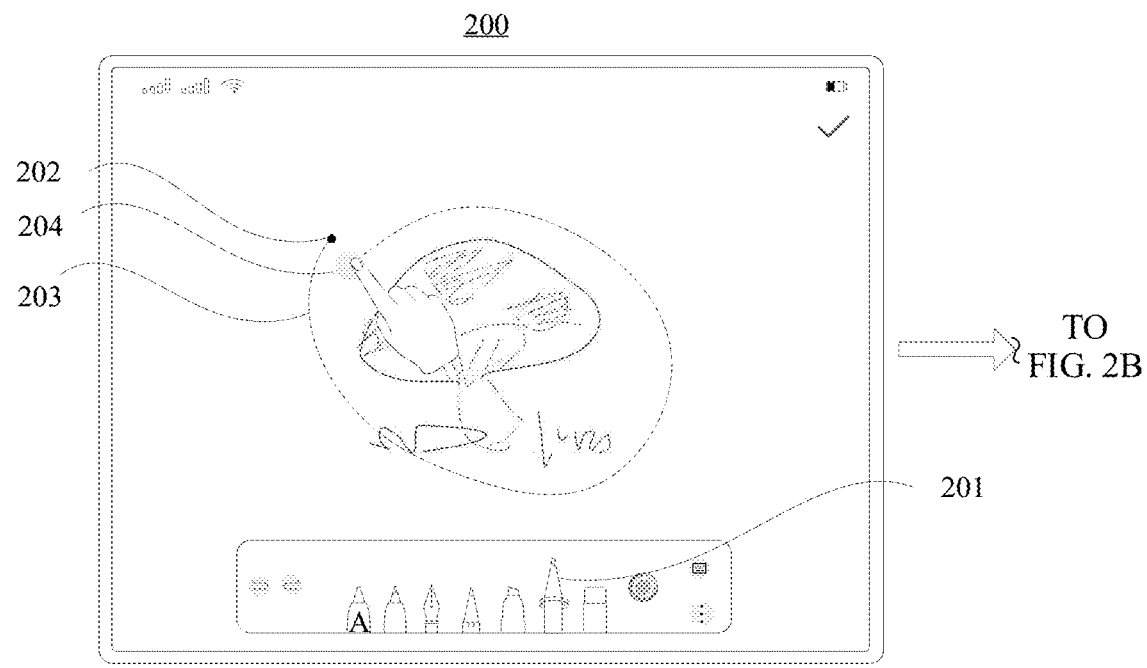
FIG. 2A and FIG. 2B are schematic diagrams of examples of some interfaces in an operation process of a display control method according to some embodiments of this application.
Figure 2B:
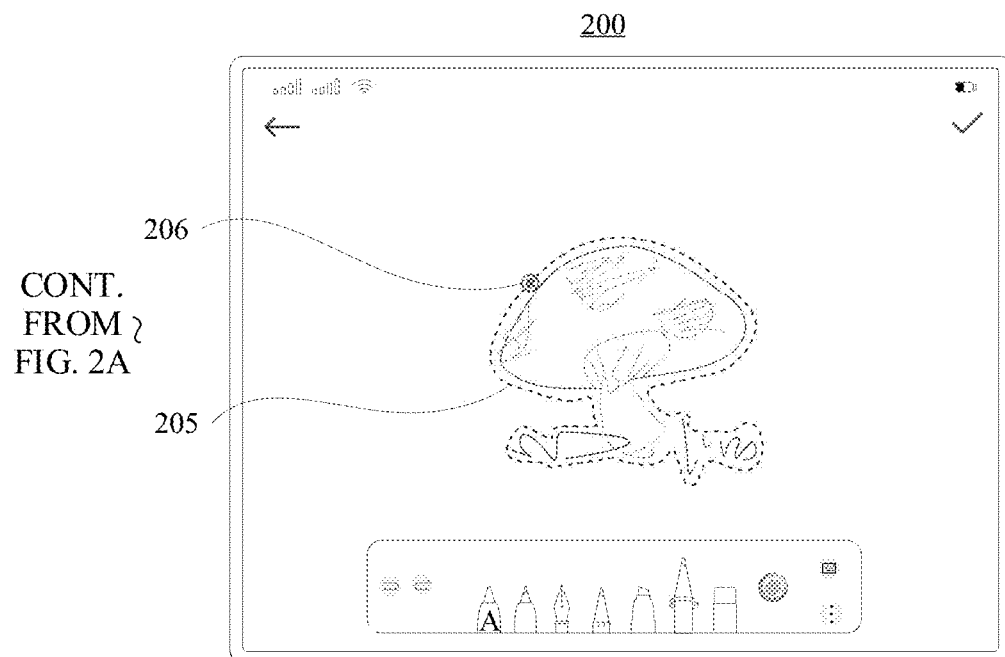

FIG. 2A and FIG. 2B are diagrams of a user interaction interface of a display control method according to an embodiment of this application.

As shown in FIG. 2A, a display interface of a tablet computer 200 displays a mushroom-shaped pattern, which may be content and a signature that are created by a user. The user wants to select the created content for other processing, for example, moving. In this case, the content and the signature that are created by the user may be an example of a target area in this embodiment of this application. In a process in which the user operates the tablet computer 200 to box-select the target area, the user may tap a lasso tool 201 on the display interface of the tablet computer 200, and then start to box-select the target area from a start point location 202 to an end point location 204. In a process of performing box selection by the user, the tablet computer 200 displays a corresponding box selection trajectory 203 in real time in response to a box selection operation of the user. In this case, the tablet computer 200 may display an interface in FIG. 2A.

As shown in FIG. 2A, the target area is included in the box selection trajectory 203. When a finger of the user leaves a touch control screen, the tablet computer 200 detects that the user completes the box selection operation, and adjusts the box selection trajectory 203 based on the target area in an area box-selected by the box selection trajectory 203 to enable the box selection trajectory 203 match an outer contour of the target area, to obtain a lasso trajectory 205, and the box selection trajectory 203 disappears. In this case, the tablet computer 200 obtains location coordinates of the start point location 202 of the box selection trajectory 203 and location coordinates of the lasso trajectory 205. Then, based on the obtained location coordinates of the start point location 202 and the obtained location coordinates of the lasso trajectory 205, a location of a point is determined on the lasso trajectory 205 as a location of a key handle. For example, a center point of an area in the lasso trajectory 205 may be determined based on the location coordinates of the lasso trajectory 205, then a straight line passing through the center point and the start point location 202 may be determined, and then a location of a point that is closest to the start point location 206 and that is among a plurality of intersection points of the straight line and the lasso trajectory 205 is used as a location of a key handle 206, as shown in FIG. 2B.

It may be learned that, in comparison with the interface shown in FIG. 1B, on the interface shown in FIG. 2B, the key handle 206 is more closely attached to the lasso trajectory 205 and the target area, and the user can more intuitively understand the target area corresponding to the key handle, so that the user can perform area transformation on the box-selected target area. A case in which the target area is located on the display interface of the tablet computer 200 and the key handle disappears does not occur. This can improve visual perception of the user, and help improve user experience.

It may be understood that the electronic device implementing the display control method in this embodiment of this application includes but is not limited to various electronic devices such as a tablet computer, a mobile phone (including a foldable-display mobile phone), a laptop computer, a desktop computer, a server, a wearable device, a head-mounted display, a mobile email device, an in-vehicle infotainment device, a portable game console, a reader device, and a television with one or more processors embedded or coupled thereto.

Figure 3:
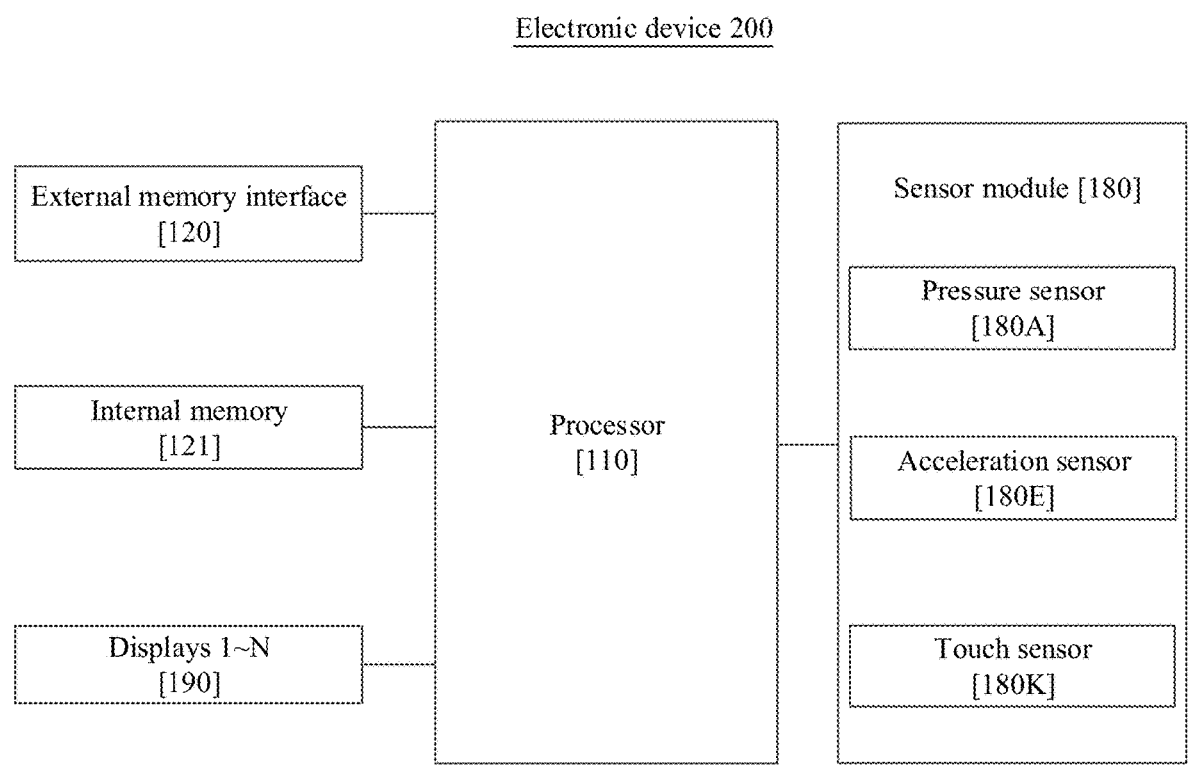
FIG. 3 is a schematic diagram of an example of a hardware structure of an electronic device 200 according to some embodiment of this application.

For example, FIG. 3 is a schematic diagram of a hardware structure of an electronic device 200.

As shown in FIG. 3, the electronic device 200 may include a processor 110, an external memory interface 120, an internal memory 121, a sensor module 180, a display 190, and the like. The sensor module 180 may include a pressure sensor 180A, an acceleration sensor 180E, a touch sensor 180K, and the like.

It may be understood that the structure shown in this embodiment of this application constitute no specific limitation on the electronic device 200. In some other embodiments of this application, the electronic device 200 may include more or fewer components than those shown in the figure, or may combine some components, or may split some components, or may have different component arrangements. The components shown in the figure may be implemented by using hardware, software, or a combination of software and hardware.

A processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural-network processing unit (NPU), and the like. Different processing units may be independent components, or may be integrated into one or more processors. The controller may generate an operation control signal based on instruction operation code and a timing signal, to complete control of instruction fetching and instruction execution. A memory may be further disposed in the processor 110, to store instructions and data. In this embodiment of this application, related instructions and data for performing the display control method in this application may be stored in the memory, and are invoked by the processor 110. The processor 110 may control, perform, and implement steps of the display control method by using the controller. A specific implementation process is described in detail below: Details are not described herein.

In some embodiments, the processor 110 may include one or more interfaces. The interfaces may include an inter-integrated circuit (I2C) interface, a mobile industry processor interface (MIPI), a general-purpose input/output (GPIO) interface, a subscriber identity module (SIM) interface, a universal serial bus (USB) interface, and/or the like.

The I2C interface is a bidirectional synchronous serial bus, including a serial data line (SDA) and a serial clock line (SCL). In some embodiments, the processor 110 may include a plurality of I2C buses. The processor 110 may be separately coupled to the touch sensor 180K and the like through different I2C bus interfaces. For example, the processor 110 may be coupled to the touch sensor 180K through the I2C interface, so that the processor 110 communicates with the touch sensor 180K through the I2C bus interface, thereby implementing a touch function of the electronic device 200.

The MIPI interface may be configured to connect the processor 110 to peripheral components such as the display 190. The MIPI interface include a camera serial interface (CSI), a display serial interface (DSI), and the like. The processor 110 and the display 190 communicate with each other through the DSI interface, to implement a display function of the electronic device 200.

The GPIO interface may be configured through software. The GPIO interface may be configured as a control signal or may be configured as a data signal. In some embodiments, the GPIO interface may be configured to connect the processor 110 to the display 190, the sensor module 180, and the like. The GPIO interface may alternatively be configured as an I2C interface, an MIPI interface, or the like.

It may be understood that an interface connection relationship between the modules shown in this embodiment of this application is merely a schematic description, and does not constitute a limitation on the structure of the electronic device 200. In some other embodiments of this application, the electronic device 200 may alternatively use an interface connection manner different from that in the foregoing embodiment, or a combination of a plurality of interface connection manners.

The electronic device 200 implements the display function by using the GPU, the display 190, the application processor, and the like. The GPU is a microprocessor for image processing, and is connected to the display 190 and the application processor. The GPU is configured to perform mathematical and geometric computing for graphics rendering. The processor 110 may include one or more GPUs, executing program instructions to generate or change display information.

The display 190 is configured to display an image, a video, or the like. The display 190 includes a display panel. The display panel may use a liquid crystal display (LCD), an organic light-emitting diode (OLED), an active-matrix organic light emitting diode or an active-matrix organic light emitting diode (AMOLED), a flexible light-emitting diode (FLED), a Mini-LED, Micro-LED, Micro-OLED, a quantum dot light emitting diode (QLED), and the like. In some embodiments, the electronic device 200 may include 1 or N displays 190, where N is a positive integer greater than 1.

The external memory interface 120 may be configured to connect to an external memory card, for example, a Micro SD card, to expand a storage capability of the electronic device 200. The external memory card communicates with the processor 110 through the external memory interface 120, to implement a data storage function, for example, to store files such as music and a video in the external memory card.

The internal memory 121 may be configured to store computer-executable program code, and the executable program code includes instructions. The internal memory 121 may include a program storage area and a data storage area. The program storage area may store an operating system, an application required by at least one function (for example, a sound playback function or an image play back function), and the like. The data storage area may store data (for example, audio data and a phone book) created during use of the electronic device 200. In addition, the internal memory 121 may include a high-speed random access memory, and may further include a nonvolatile memory, for example, at least one disk storage device, a flash memory device, or a universal flash storage (UFS). The processor 110 performs various function applications and data processing of the electronic device 200 by running the instructions stored in the internal memory 121 and/or the instructions stored in the memory disposed in the processor.

In this embodiment of this application, the internal memory 121 may store execution instructions for implementing the display control method in this application, so that the processor 110 invokes the execution instructions for implementing the display control method in this application, and the electronic device 200 is enabled to follow the box selection operation and a control operation of the user, and implement functions of displaying and controlling the key handle.

The pressure sensor 180A is configured to sense a pressure signal, and may convert the pressure signal into an electrical signal. In some embodiments, the pressure sensor 180A may be disposed in the display 190. There are many types of pressure sensors 180A, for example, a resistive pressure sensor, an inductive pressure sensor, and a capacitive pressure sensor. The capacitive pressure sensor may include at least two parallel plates having an electrically conductive material. When force is applied onto the pressure sensor 180A, a capacitance between electrodes changes. The electronic device 200 determines strength of pressure based on a change of the capacitance. When a touch operation acts on the display 190, the electronic device 200 detects strength of the touch operation by using the pressure sensor 180A. The electronic device 200 may also calculate a touch location based on a detection signal of the pressure sensor 180A. In some embodiments, touch operations acting on a same touch location but with different touch operation intensity may correspond to different operation instructions. For example, when a touch operation whose touch operation intensity is less than a first pressure threshold is performed on an SMS message application icon, an instruction for viewing an SMS message is executed. For example, when a touch operation whose touch operation intensity is greater than or equal to the first pressure threshold is performed on the SMS message application icon, an instruction for creating a new SMS message is executed.

The acceleration sensor 180E may detect accelerations of the electronic device 200 in all directions (generally in three axes), and may detect a magnitude and a direction of gravity when the electronic device 200 is static. The acceleration sensor 180E may be further configured to identify a posture of the electronic device, and is applied to applications such as switching between a landscape mode and a portrait mode and a pedometer.

The touch sensor 180K is also referred to as a "touch device". The touch sensor 180K may be disposed on the display 190. The touch sensor 180K and the display 190 form a touch control screen, which is also referred to as "touch control screen". The touch sensor 180K is configured to detect a touch operation performed on or near the touch sensor 180K. The touch sensor may transmit the detected touch operation to the application processor, to determine a type of a touch event. A visual output related to the touch operation may be provided by using the display 190. In this embodiment of this application, for example, the touch control screen including the touch sensor 180K and the display 190 may detect the box selection operation of the user. With the box selection operation of the user, the touch control screen may display a corresponding interface change, for example, display the box selection trajectory on the display interface. For example, when the user completes the box selection operation, and the finger leaves the touch control screen, the touch control screen may display the lasso trajectory corresponding to the box selection trajectory. For details, refer to the following detailed description. Details are not described herein. In some other embodiments, the touch sensor 180K may alternatively be disposed on a surface of the electronic device 200, and is at a location different from that of the display 190.

It may be understood that the system structure shown in FIG. 3 does not constitute a specific limitation on the electronic device 200. In some other embodiments of this application, the electronic device 200 may include more or fewer components than those shown in FIG. 3, or may combine some components, or may split some components, or may have different component arrangements.

To simplify description, the following describes the technical solutions of this application by using the electronic device 200 as a tablet computer.

The following further describes in detail a key handle determining method in this application with reference to the scenario diagram shown in FIG. 1A and FIG. 1B and the system structural diagram shown in FIG. 2A and FIG. 2B.

Embodiment 1

The following describes in detail a specific process in which the tablet computer 200 implements the display control method in this embodiment of this application with reference to a flowchart and schematic diagrams of related interfaces.

Figure 4:
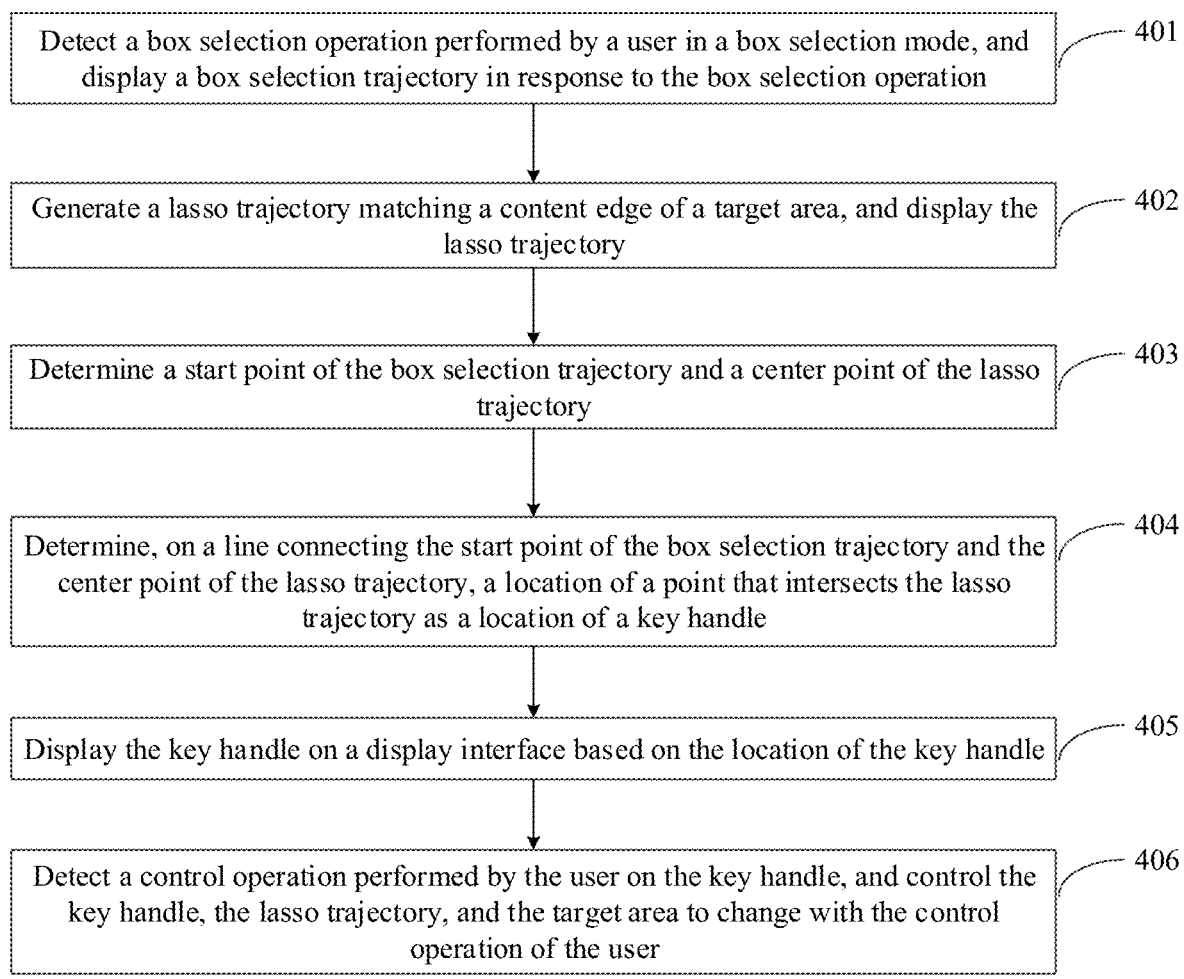
FIG. 4 is a schematic flowchart of an example of implementing a display control method according to some embodiments of this application.

FIG. 4 is a schematic flowchart of a display control method according to an embodiment of this application. In this embodiment of this application, an execution body of each step shown in FIG. 4 is the tablet computer 200. To avoid repeated description, the following does not describe the execution body of each step when describing execution content of each step.

As shown in FIG. 4, this procedure includes the following steps.

401: Detect a box selection operation performed by a user in a box selection mode, and display a box selection trajectory in response to the box selection operation.

For example, the user may operate a touch control screen of the tablet computer 200 to switch to the box selection mode. It may be understood that, in some embodiments, an operation of switching to the box selection mode may be an operation of tapping a lasso tool on a display interface of the tablet computer 200 by the user. In this case, in response to the operation of the user, the tablet computer 200 enlarges and displays the tapped lasso tool, for example, the lasso tool 201 shown in FIG. 2A.

It may be understood that, in some embodiments, the box selection operation in step 401 may be an operation in which the user touches and slides on the touch control screen of the tablet computer 200 with a finger. In some other embodiments, the box selection operation in step 401 may be an operation in which the user touches and slides on the touch control screen of the tablet computer 200 by using a stylus, for example, an operation in which on the touch control screen of the tablet computer 200, the user uses a stylus or a finger to touch and slide along an outer contour of a target area. When detecting the box selection operation of the user, the tablet computer 200 senses coordinates of a touch location corresponding to the box selection operation of the user, and displays a touch trajectory of the user at the corresponding touch location on the touch control screen, that is, obtains the box selection trajectory matching the box selection operation of the user.

It may be understood that, in some embodiments, the box selection trajectory may be a rectangular trajectory, an elliptical trajectory; or a trajectory of any irregular shape drawn by the user.

Content in an area box-selected by the box selection operation may be a text, a text segment, a graphic, an image, or another area object, for example, after the user enables a memo of the tablet computer, a graphic that is hand-drawn, an image that is pasted, and text that is edited in the memo. The box selection trajectory may be in any color or any shape line. For example, the box selection trajectory is a black dashed line, for example, the box selection trajectory 203 in FIG. 2A.

402: Generate a lasso trajectory matching an edge of the target area box-selected by the box selection trajectory, and display the lasso trajectory.

For example, a process of generating the lasso trajectory in step 402 may be: the tablet computer 200 obtains the target area box-selected by the box selection trajectory, and then determines edge information of the target area based on the obtained target area. The tablet computer 200 generates the lasso trajectory based on the edge information. The lasso trajectory may be the same as a location corresponding to the edge information, or may be similar to the location corresponding to the edge information. For example, when the box-selected content is a picture, the tablet computer 200 obtains a picture edge of the picture, and then generates a lasso trajectory matching the picture edge. The lasso trajectory may completely overlap the picture edge, that is, the picture edge is used as the lasso trajectory of the picture. The picture edge may alternatively be located within the lasso trajectory, for example, in a location relationship between the lasso trajectory and the edge of the target area shown in FIG. 2B.

It may be understood that, in some embodiments, a shape, a size, and a location of the box selection trajectory are the same as those of the lasso trajectory. For example, when an area box-selected by the box selection trajectory is a rectangular area, the box selection trajectory and the lasso trajectory are rectangular trajectories that are the same in shape, size, and location. In some embodiments, a shape, a size, and a location of the box selection trajectory are different from those of the lasso trajectory. For example, when the area box-selected by the box selection trajectory is an area of any shape, the box selection trajectory is a trajectory of any irregular shape drawn by the user, and a box selection trajectory drawn by the user does not exactly match a content edge of the box-selected area. In this case, a shape, a size, and a location of a lasso trajectory generated based on the content edge of the box-selected area are different from those of the box selection trajectory, for example, the box selection trajectory 203 in FIG. 2A and the lasso trajectory 205 in FIG. 2B.

403: Determine a start point of the box selection trajectory and a center point of the lasso trajectory.

For example, the tablet computer 200 obtains the box selection operation performed by the user in the box selection mode, and then determines coordinates of a first touch location corresponding to the box selection operation as the start point of the box selection trajectory. The tablet computer 200 may obtain location coordinates of the lasso trajectory generated in step 402, and determine a center point of the target area based on the obtained location coordinates of the lasso trajectory. Further, for example, a width direction (namely, a horizontal direction) of the tablet computer 200 is a direction of an x-axis and a height direction (namely, a vertical direction) of the tablet computer 200 is a direction of a y-axis. Determining of the center point of the lasso trajectory may be, for example, the tablet computer 200 obtains two endpoints in the direction of the x-axis and two endpoints in the direction of the y-axis that are in the location coordinates of the lasso trajectory, determines a rectangular area based on the four endpoints, and then determines a center point of the rectangular area as the center point of the lasso trajectory.

Figure 5A:
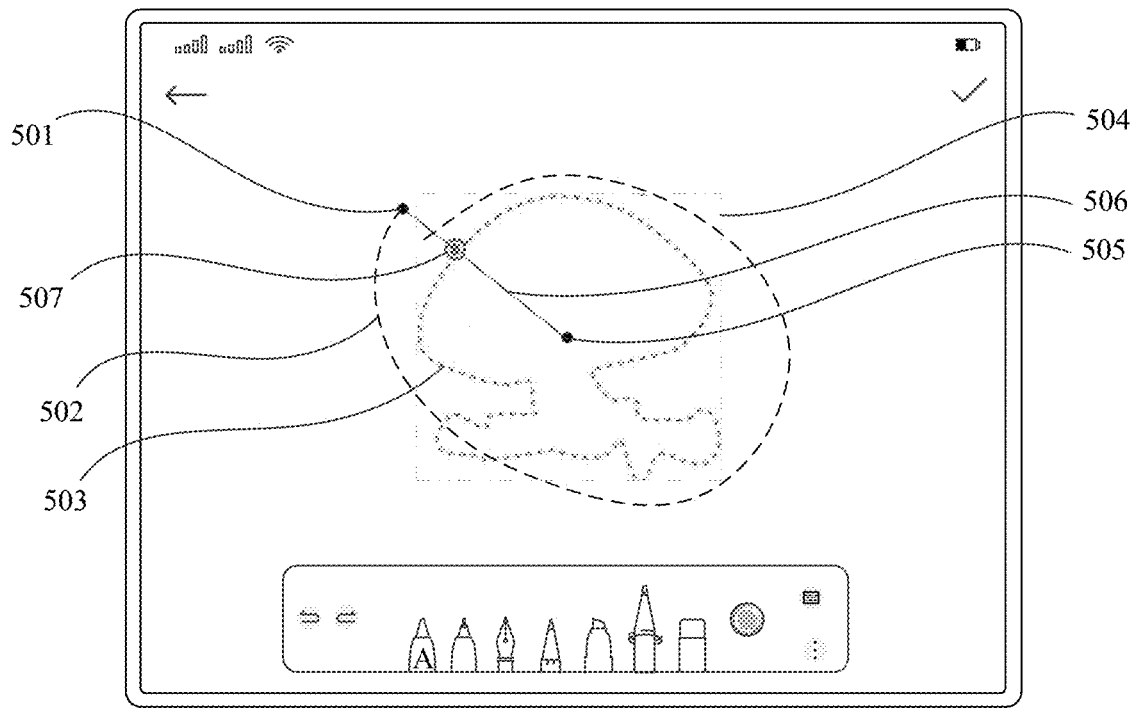
FIG. 5A to FIG. 5R are schematic diagrams of examples of some interfaces in an operation process of a display control method according to some embodiments of this application.
Figure 5B:
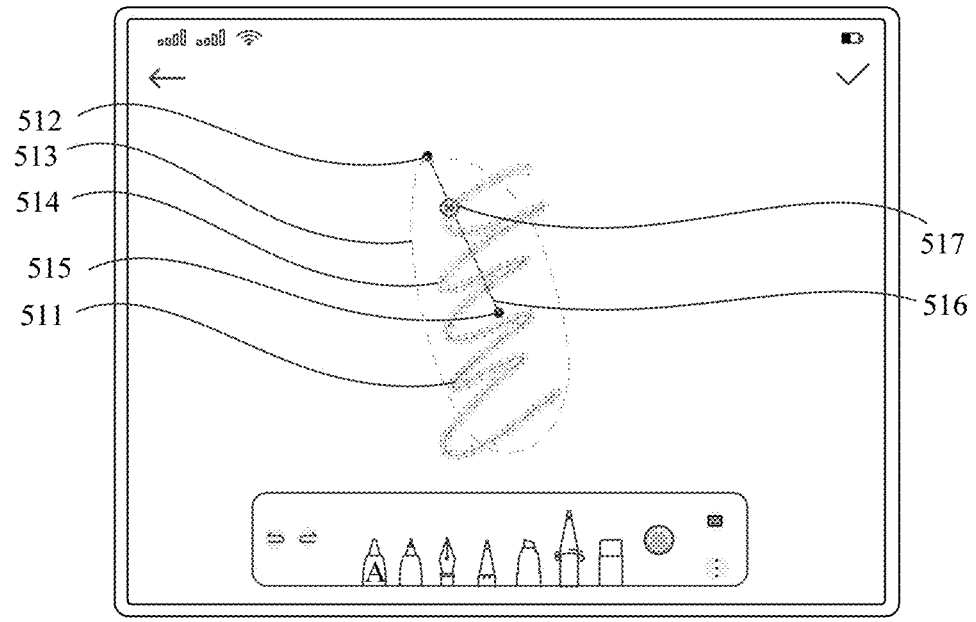

For example, FIG. 5A and FIG. 5B are schematic diagrams of a key handle determining method according to Embodiment 1.

The user operates the touch control screen of the tablet computer 200 to complete the box selection operation and generate the box selection trajectory and the lasso trajectory, that is, to perform step 401 and step 402. For details, refer to related descriptions in FIG. 2A and FIG. 2B. Details are not described herein again.

As shown in FIG. 5A, after performing step 401 and step 402, the tablet computer 200 generates a box selection trajectory 502 and a lasso trajectory 503. The tablet computer 200 may obtain the coordinates of the first touch location when the user performs the box selection operation, namely, a start point 501 of the box selection trajectory, which is referred to as a start point location 501 in the following. The tablet computer 200 may determine, based on location coordinates of the lasso trajectory 503 generated in step 402, four endpoints that are in the direction of the x-axis and the direction of the y-axis that are of the location coordinates of the lasso trajectory 503, and obtain a rectangular area 504 based on the four endpoints. Finally, a center point 505 of the rectangular area 504 is calculated, and the calculated center point 505 is used as a center point of an area box-selected by the lasso trajectory 503. The center point of the rectangular area 504 is an intersection point of two diagonal lines of the rectangular area 504.

404: Determine, on a line connecting the start point of the box selection trajectory and the center point of the lasso trajectory, a location of a point that intersects the lasso trajectory as a location of a key handle.

For example, after obtaining the start point of the box selection trajectory and the center point of the lasso trajectory in step 403, the tablet computer 200 may determine a straight line connecting the two points, and use the location of the point at which the straight line intersects the lasso trajectory as the location of the key handle. Further, when the line connecting the start point of the box selection trajectory and the center point of the lasso trajectory has a plurality of intersection points with the lasso trajectory, a location of an intersection point that is closest to the start point of the box selection trajectory and that is in the plurality of intersection points is determined as the location of the key handle. The following further describes a method for determining the location of the key handle.

For example, still referring to FIG. 5A, after obtaining the start point location 501 and the center point 505 of the lasso trajectory, the tablet computer 200 may determine a straight line 506 connecting the start point location 501 and the center point 505. The tablet computer 200 may further determine that the straight line 506 and the lasso trajectory 503 intersect at an intersection point 507, and a location of the intersection point 507 is the location of the key handle.

It may be understood that the start point location 501 and the center point 505 that are obtained by the tablet computer 200 may be represented as coordinates of two locations, the straight line 506 determined based on the start point location 501 and the center point 505 may be represented as a function, and the location of the key handle 507 may be represented as coordinates. In other words, when performing step 404, the tablet computer does not need to simulate and render an interface diagram shown in FIG. 5A, but determines the coordinates of the key handle 507 by obtaining the coordinates of the start point location 501 and the center point 505 and the function of the straight line 506.

When the line connecting the start point of the box selection trajectory and the center point of the lasso trajectory intersects the lasso trajectory at a plurality of points, a location of a point that is closest to the start point of the box selection trajectory and that is in the plurality of points may be determined as the location of the key handle, which is specifically shown in FIG. 5B.

When operating the tablet computer 200 to enter the box selection mode, the user may perform the box selection operation to box-select a graphic 511. For details, refer to related descriptions in FIG. 2A and FIG. 2B. Details are not described herein again.

Referring to FIG. 5B, the tablet computer 200 performs step 401 and step 402, to draw a box selection trajectory 513 on the touch control screen of the tablet computer 200 and generate a lasso trajectory 514. After performing step 403, the tablet computer 200 obtains a start point location 512 and a center point 515 of an area box-selected by the lasso trajectory 514. Then, the tablet computer 200 determines, based on the obtained start point location 512 and the obtained center point 515, a straight line 516 connecting the two points. In this case, when determining intersection points of the straight line 516 and the lasso trajectory 514, the tablet computer 200 obtains locations of 10 intersection points, and the tablet computer 200 determines a location of an intersection point 517 closest to the start point location 512 as the location of the key handle.

It may be understood that, when the user completes the box selection operation by operating the tablet computer 200, a start point of the box selection operation (namely, the start point of the box selection trajectory) may be located on the display interface on the touch control screen of the tablet computer 200. In this case, the point that is closest to the start point of the box selection operation and that is in the 10 points at which the line segment 516 intersects the lasso trajectory 514 is located on the display interface on the touch control screen of the tablet computer 200. This is convenient for the user to quickly determine the location of the key handle 517 when the user needs to operate the key handle 517 to control the graphic 511 to change a location or change to another shape.

In addition, determining a point on the lasso trajectory as the key handle enables the key handle to be attached to the lasso trajectory, so that the display interface of the tablet computer 200 is more aesthetic, and visual perception and use experience of the user are improved.

405: Display the key handle on the display interface based on the location of the key handle.

For example, the key handle displayed on the display interface may be a graphic of any preset shape, for example, the key handle 507 shown in FIG. 5A. In some embodiments, a center point of a shape of the key handle matches the location of the key handle determined in step 404.

In some embodiments, key handles of different application windows have a same shape and a same color, for example, are the key handle 507 shown in FIG. 5A. In some embodiments, a key handle of a corresponding shape and color may be preset based on attribute information of an application or an application window. The attribute information may be, for example, a background color of the application window, a size of the application window; or a type of the application. Specifically, when performing step 405 in the display control method described in Embodiment 1, the tablet computer 200 may obtain the attribute information of the application or the application window; and determine, based on the obtained attribute information, the shape and the color corresponding to the key handle that need to be displayed.

For example, it is assumed that two key handles are preset in the tablet computer 200: a key handle 1 in which a black circle and a white circular arrow are combined, and a key handle 2 in which a white circle and a black circular arrow are combined. In addition, a key handle displayed when a background color of a preset application window in the tablet computer 200 is white is the key handle 1, or a key handle displayed when the background color is black is the key handle 2. When performing step 405 in the display control method described in Embodiment 1, the tablet computer 200 may determine that the background color of the application window is white, and when displaying the key handle, the tablet computer 200 may display the key handle 1 at the determined location of the key handle.

406: Detect a control operation performed by the user on the key handle, and in response to the control operation, control the key handle, the lasso trajectory, and the target area to change with the control operation of the user.

For example, when the user may complete the control operation by operating the key handle on the display interface of the tablet computer 200, the tablet computer 200 obtains a touch area and a touch trajectory of the user in real time, and controls the target area, the key handle, and the lasso trajectory based on the control operation to correspondingly change.

It may be understood that when detecting the control operation performed by the user on the key handle or the target area, the tablet computer 200 controls the key handle, the lasso trajectory, and the target area of the lasso trajectory to correspondingly change. When detecting that the control operation of the user occurs outside the target area and the key handle, the tablet computer 200 does not respond to the control operation of the user, that is, the target area does not change.

In addition, to improve stability of the key handle, when controlling the target area to change, the tablet computer 200 also controls the lasso trajectory and the key handle to correspondingly change. It may be understood that in a process in which the user completes the control operation, relative locations of the key handle, the lasso trajectory, and the area box-selected by the lasso trajectory remain unchanged, so that the user can accurately and quickly complete an operation when performing a next control operation on the key handle, and stability of the key handle is high.

Figure 5C:
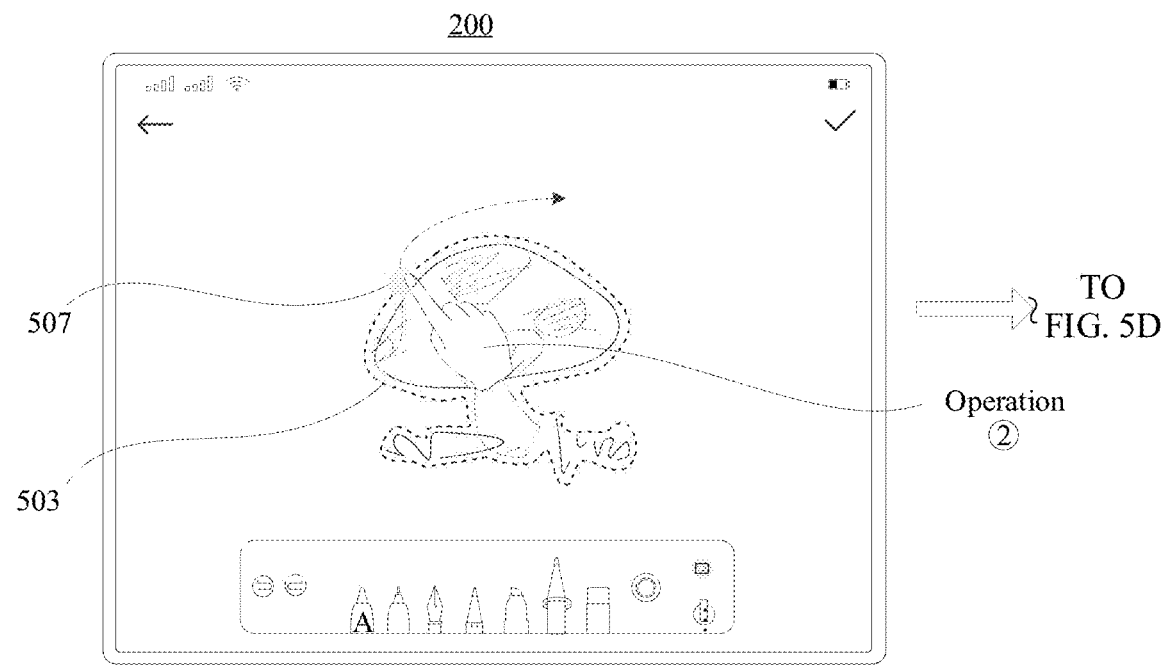
Figure 5D:
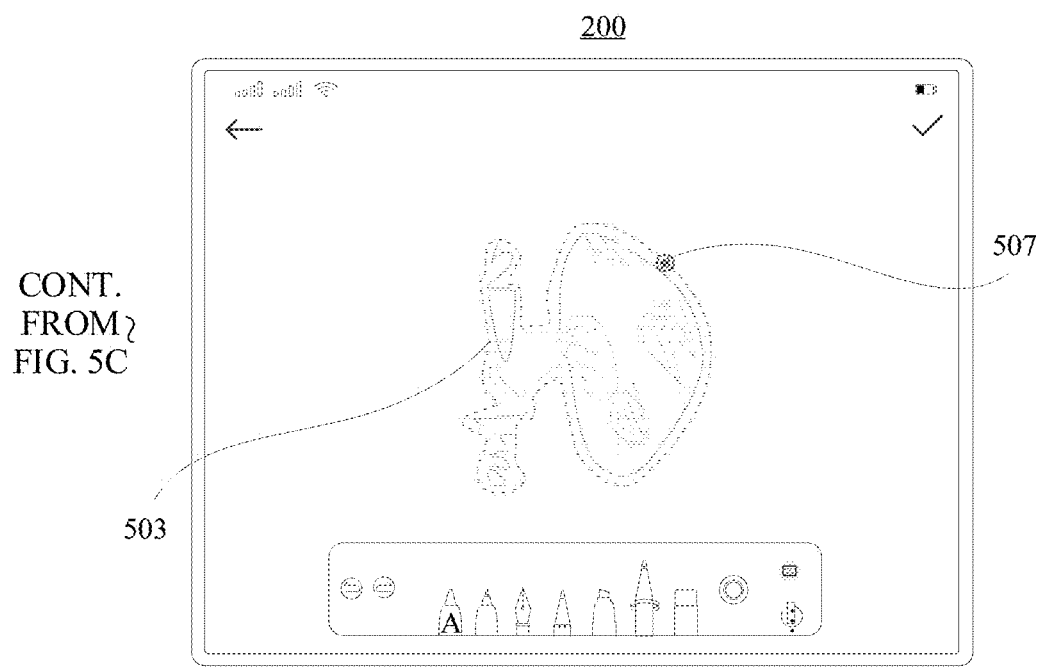
Figure 5E:
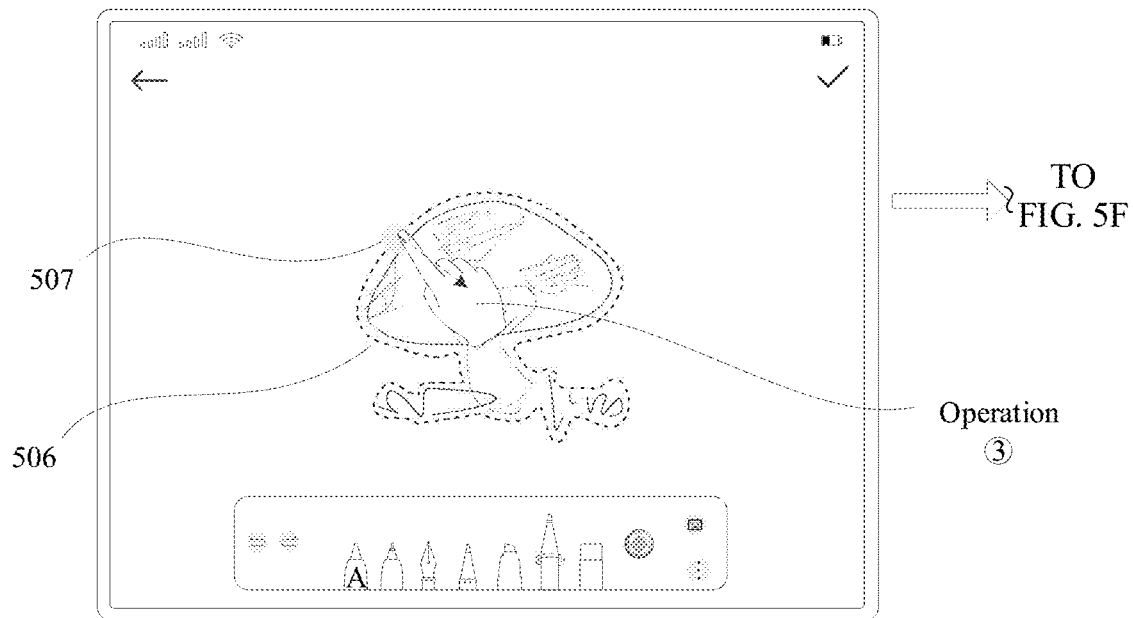
Figure 5F:
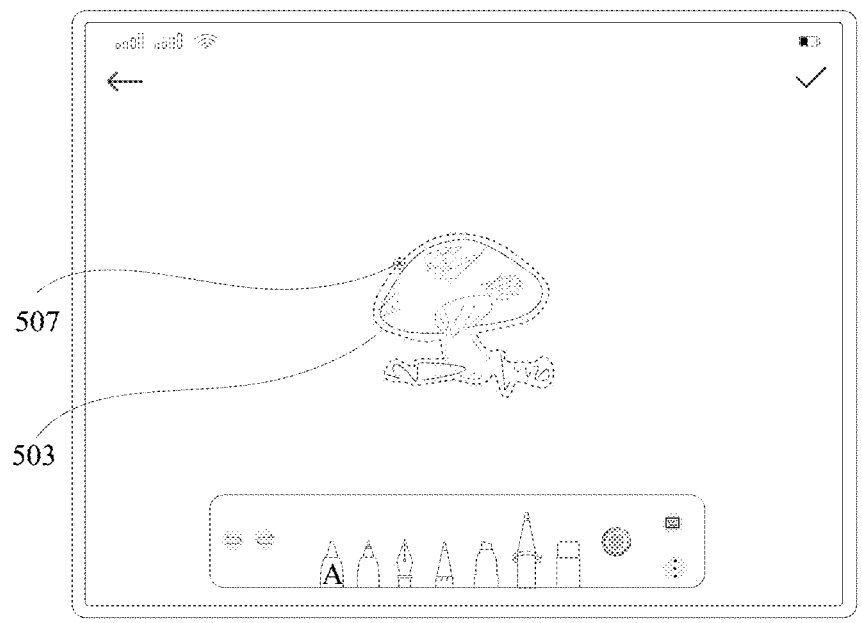
Figure 5G:
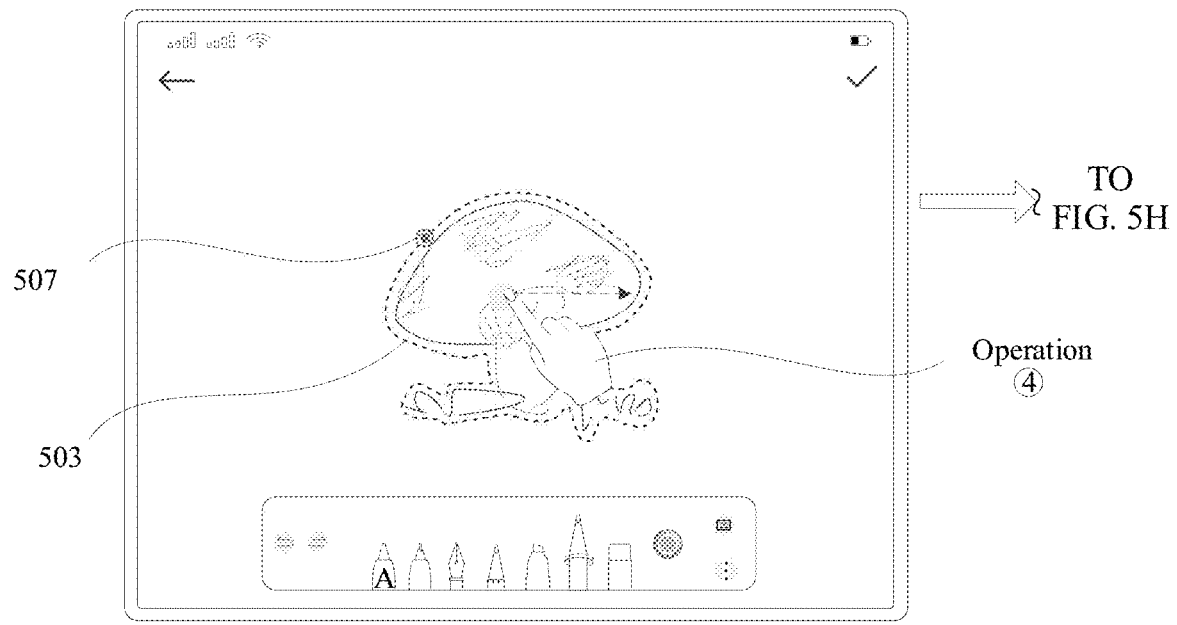
Figure 5H:
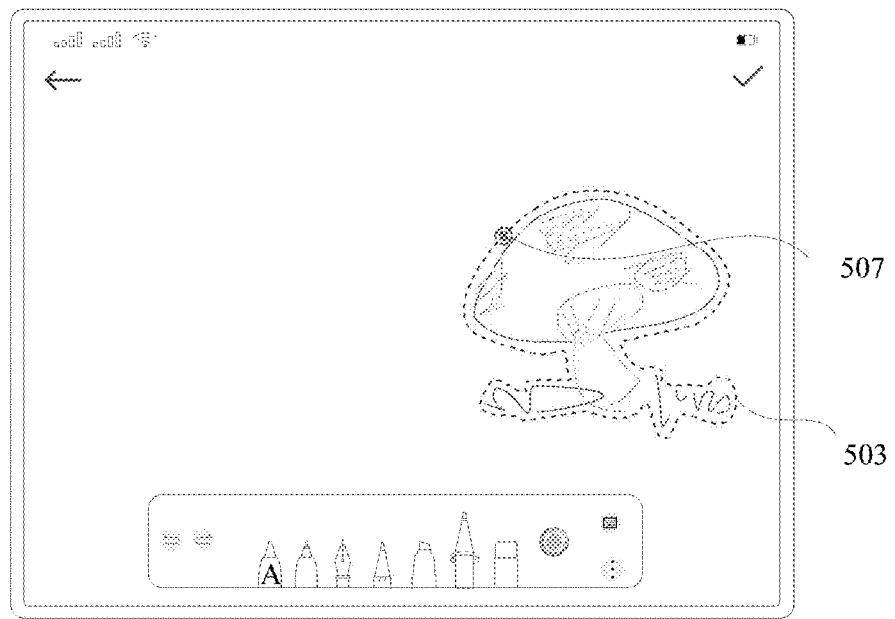
Figure 5I:
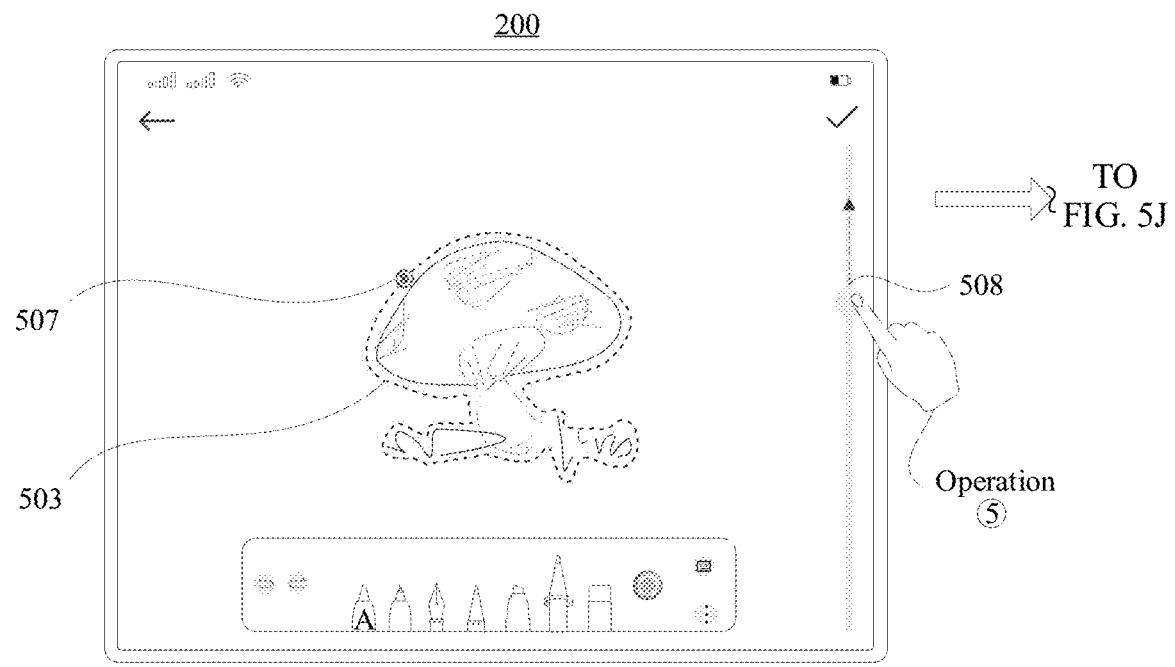
Figure 5J:
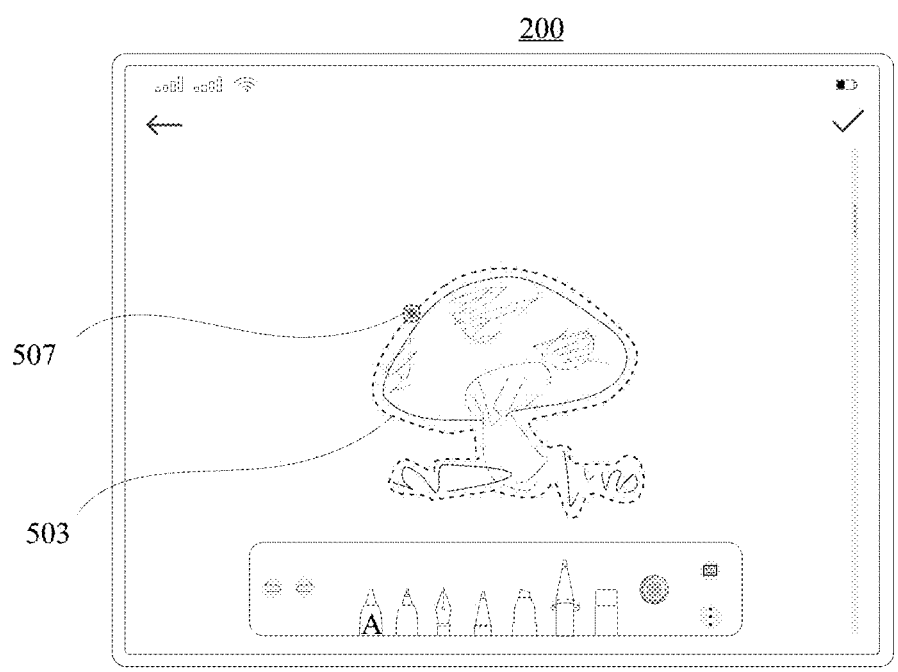
Figure 5K:
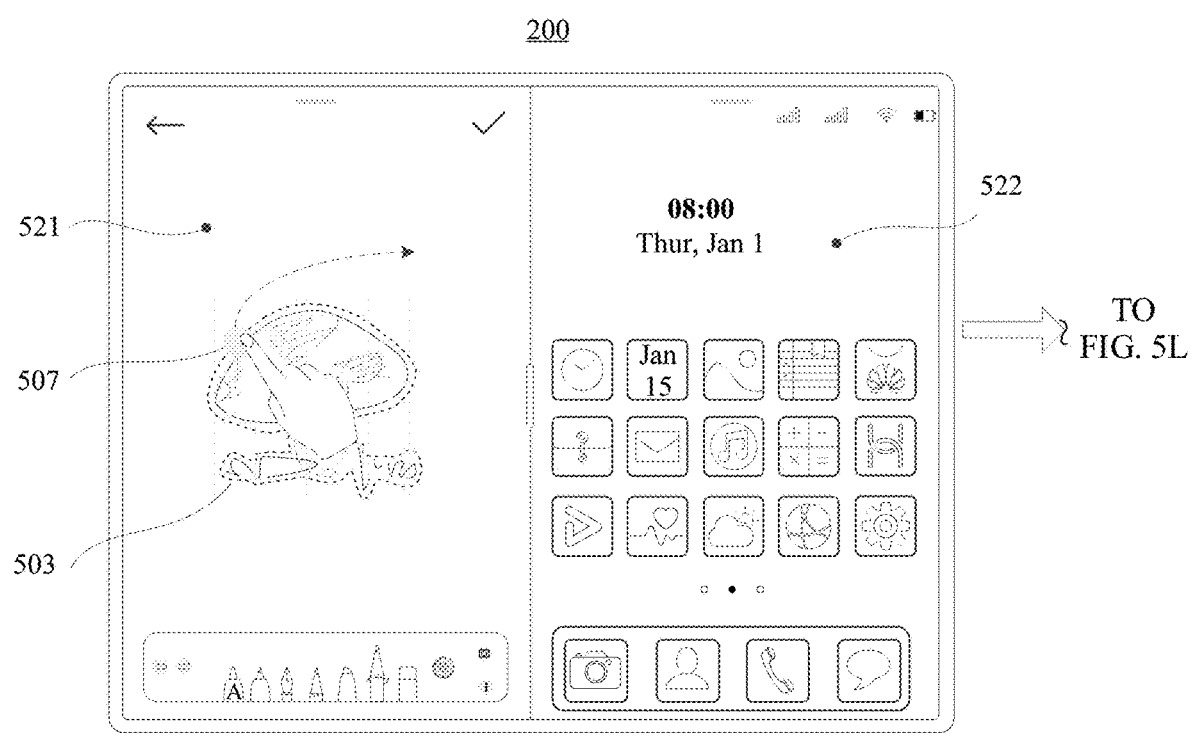
Figure 5L:
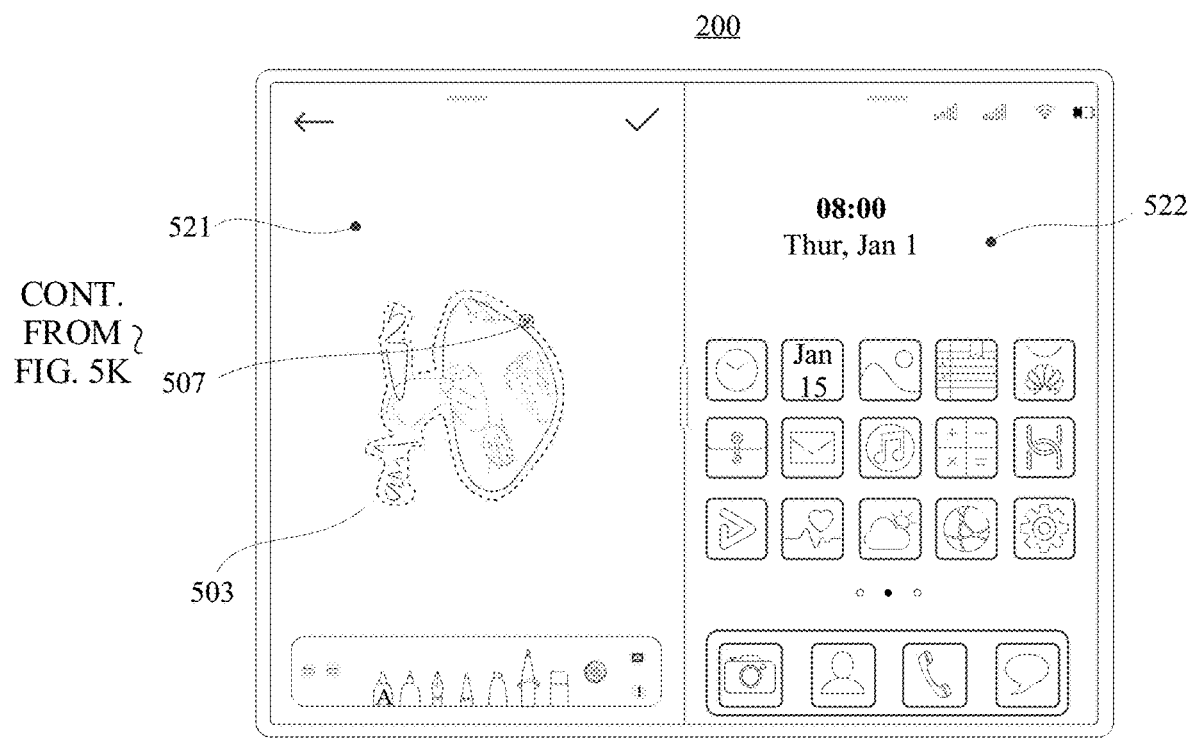
Figure 5M:
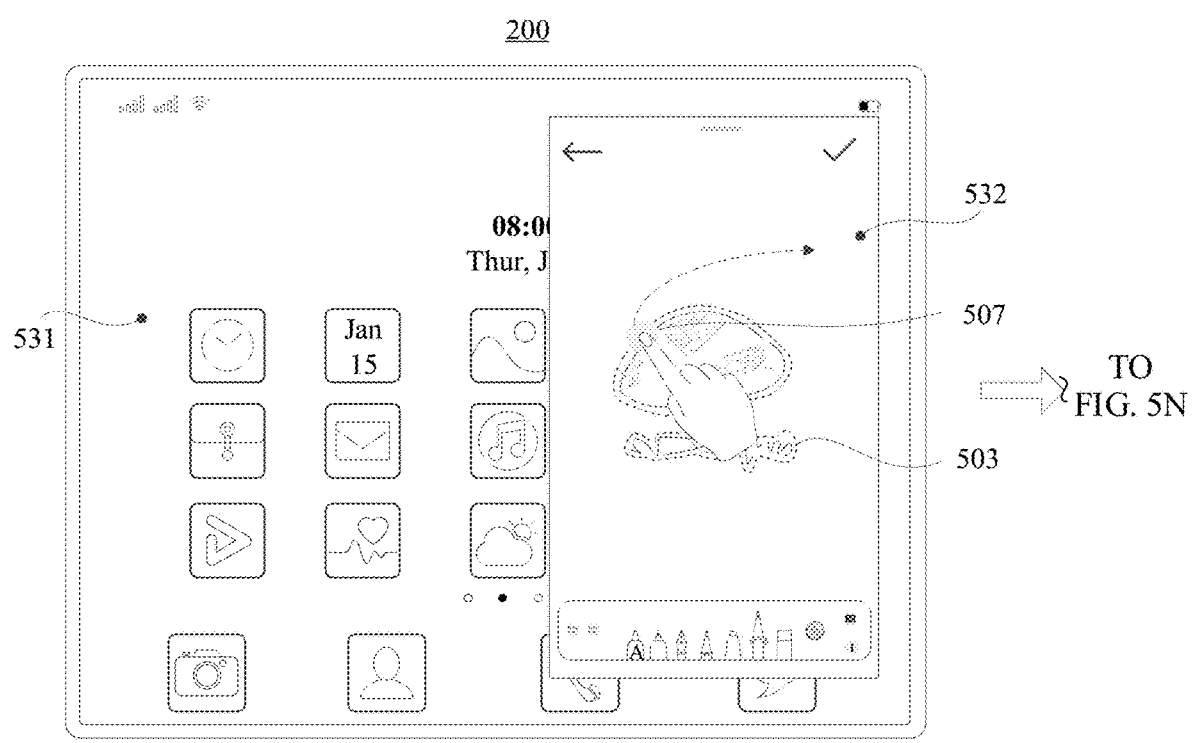
Figure 5N:
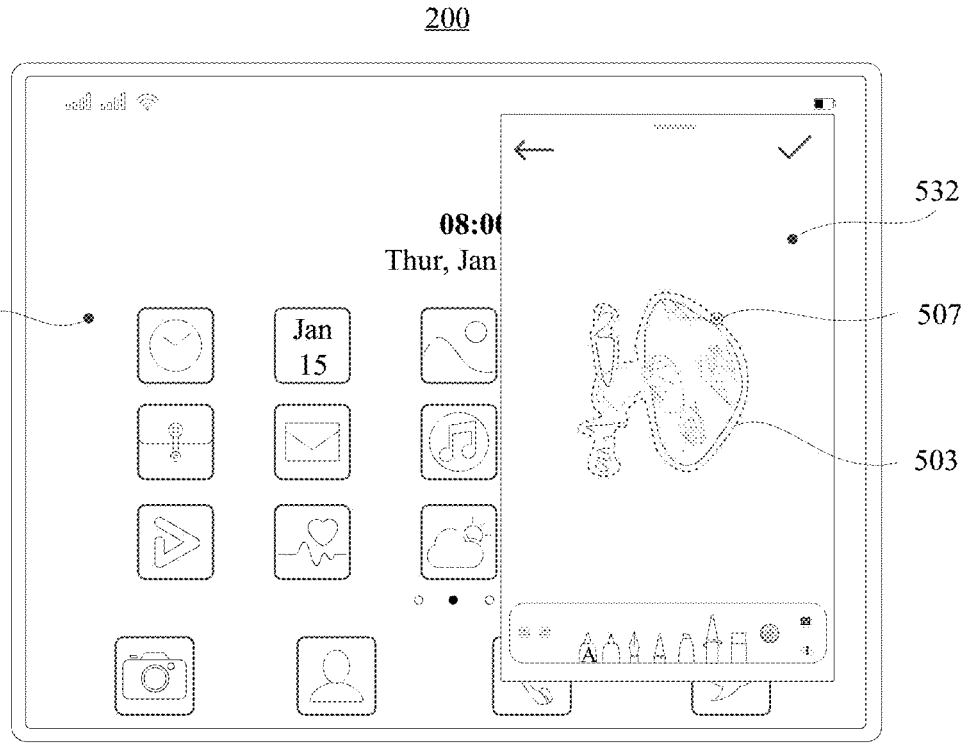
Figure 5O:
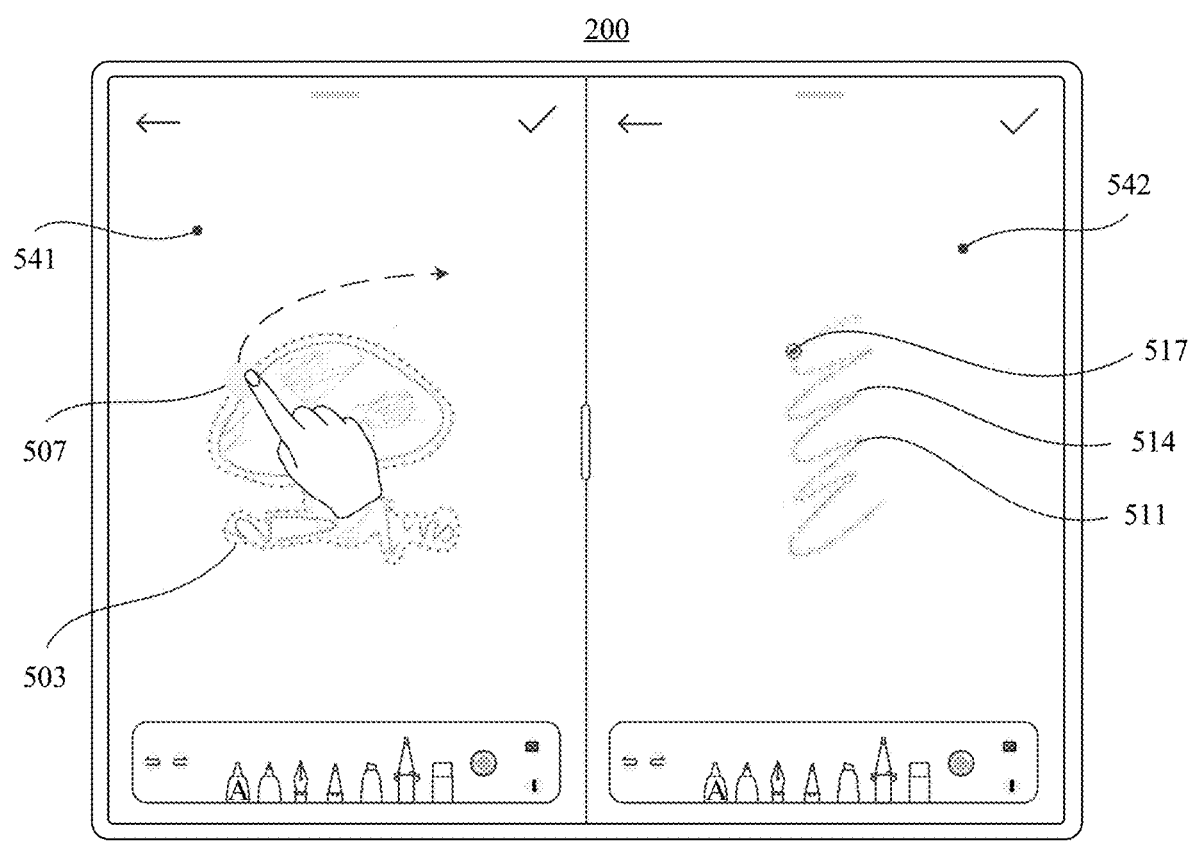
Figure 5P:
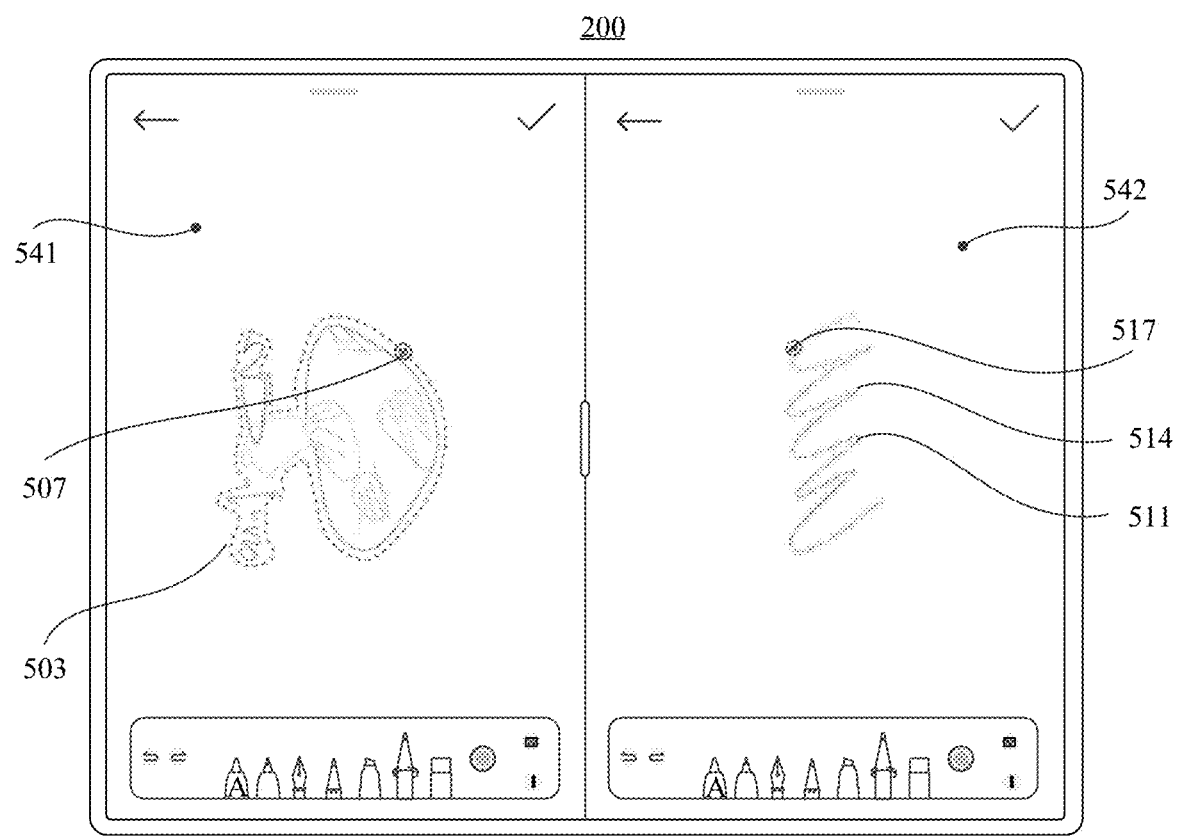
Figure 5Q:
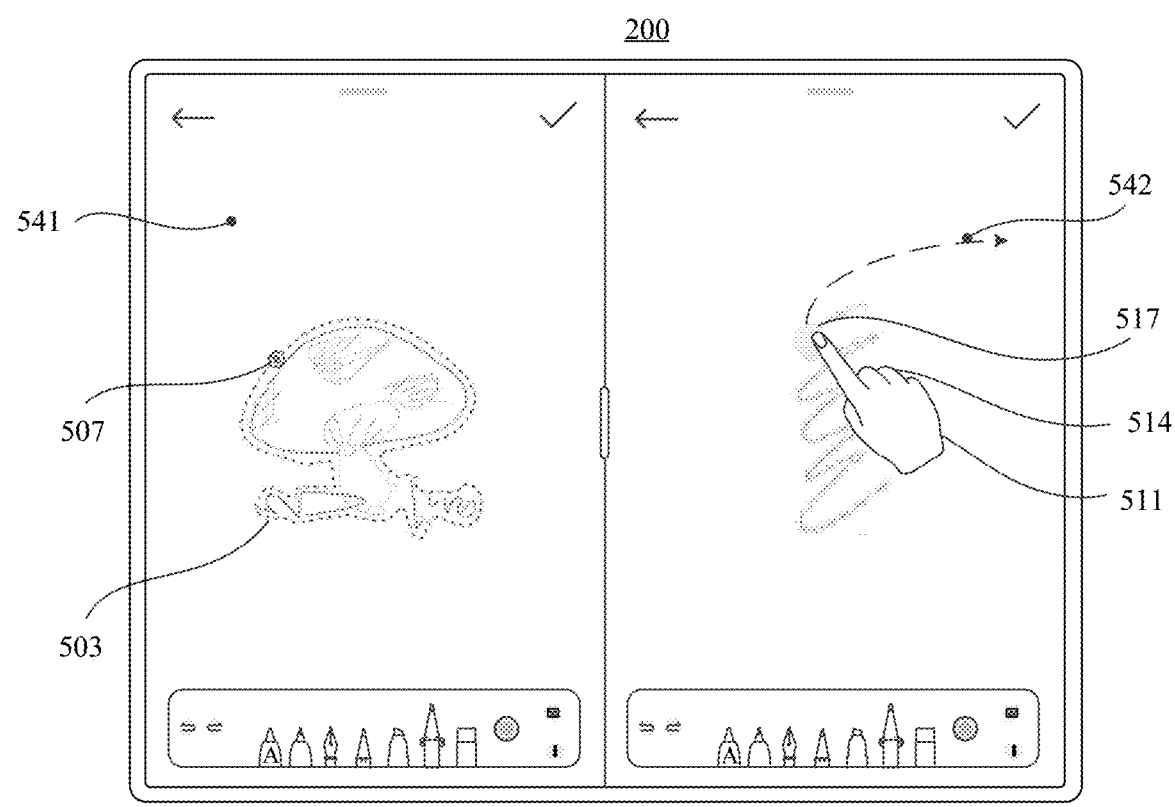
Figure 5R:
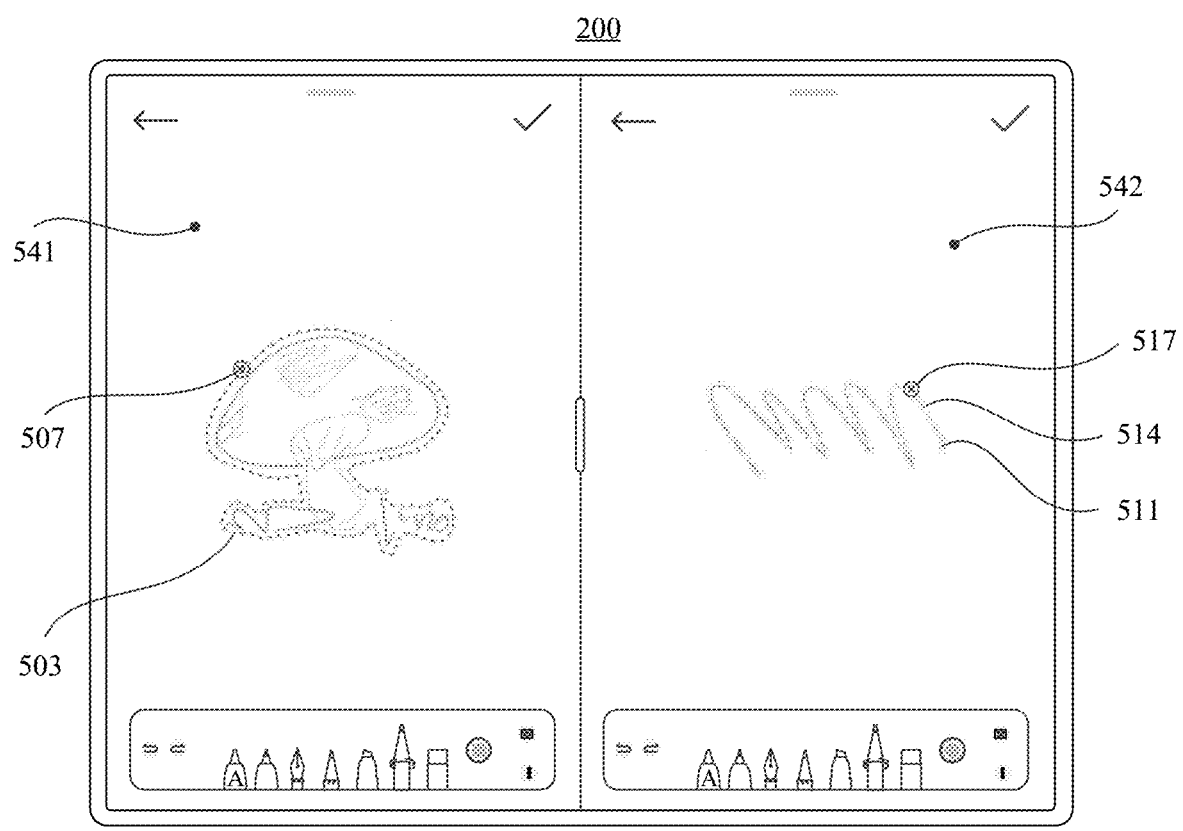

FIG. 5C to FIG. 5R are some diagrams of interface changes obtained when step 406 is performed in Embodiment 1. The following further describes step 406 with reference to FIG. 5C to FIG. 5M.

Refer to some interface changes shown in FIG. 5C to FIG. 5D. In some embodiments, the user may operate the key handle displayed in step 405 to control the target area to perform rotation transformation. The target area may be an image and a signature that are of a mushroom shape and that are drawn by the user in FIG. 5C.

After the user operates the touch control screen of the tablet computer 200 in the box selection mode to perform the box selection operation, the tablet computer 200 displays the lasso trajectory and the key handle on the touch control screen of the tablet computer 200. As shown in FIG. 5C, the lasso trajectory 503 and the key handle 507 are displayed on the touch control screen of the tablet computer 200, and an area box-selected by the lasso trajectory 503 is the target area. After the user operates the key handle 507 displayed on the touch control screen of the tablet computer 200 to rotate clockwise by 90°, that is, performs an operation (2) in FIG. 5C, an interface shown in FIG. 5D may be displayed on the touch control screen of the tablet computer 200.

Still referring to FIG. 5D, after the user operates the key handle 507 to perform a control operation of clockwise rotation of 90°, the key handle 507 and the lasso trajectory 503 rotate clockwise by 90° with the target area. Relative locations of the key handle 507, the lasso trajectory 503, and the target area remain unchanged.

It may be understood that when the user operates the key handle 508 to perform the control operation of clockwise rotation of 90°, the tablet computer 200 may control the target area to clockwise rotate by 90° by using the center point of the target area as a rotation center.

In addition, the rotation transformation completed by the operation (2) performed by the user may be used for location transformation of the target area, and a size of the target area may not be changed. When controlling the lasso trajectory 503 and the key handle 507 to simultaneously change, the tablet computer 200 may control the lasso trajectory 503 and the key handle 507 to perform location transformation.

Refer to some interface changes shown in FIG. 5E to FIG. 5F. In some embodiments, the user may operate the key handle displayed in step 405 to control the target area to perform zoom transformation.

After the user operates the touch control screen of the tablet computer 200 in the box selection mode to perform the box selection operation, the tablet computer 200 displays the lasso trajectory and the key handle on the touch control screen of the tablet computer 200. As shown in FIG. 5E, the lasso trajectory 503 and the key handle 507 are displayed on the touch control screen of the tablet computer 200, and an area box-selected by the lasso trajectory 503 is the target area. After the user operates the key handle 507 displayed on the touch control screen of the tablet computer 200 to slide toward a lower right corner of the touch control screen of the tablet computer 200, that is, perform an operation (3) in FIG. 5E, an interface shown in FIG. 5F is displayed on the touch control screen of the tablet computer 200.

Still referring to FIG. 5F, an operation in which the user operates the key handle 507 to slide toward the lower right corner of the touch control screen of the tablet computer 200 is controlling the target area to perform zoom-out transformation, and the key handle 507 and the lasso trajectory 503 are zoomed out by a corresponding percentage following with the target area. Relative locations of the key handle 507, the lasso trajectory 503, and the target area remain unchanged.

It may be understood that when the user operates the key handle 508 to slide toward the lower right corner of the touch control screen of the tablet computer 200, the tablet computer 200 may control the target area to zoom out by a specific percentage by using the center point of the target area as a center of the zoom-out transformation. A zoom-out percentage is proportional to a sliding distance of the operation 3 performed by the user.

In addition, the operation (3) performed by the user is used for shape transformation of the target area. When controlling the lasso trajectory 503 and the key handle 507 to simultaneously change, the tablet computer 200 may also control the lasso trajectory 503 and the key handle 507 to perform shape transformation.

In some embodiments, when the key handle is located directly above the target area, the target area is controlled to perform zoom transformation, or the user operates the key handle 507 displayed on the touch control screen of the tablet computer 200 to slide toward a lower edge of the touch control screen of the tablet computer 200. In some other embodiments, when the key handle is located in the upper right of the target area, the target area is controlled to perform zoom transformation, or the key handle displayed on the touch control screen of the tablet computer 200 may be operated to slide toward a lower left corner of the touch control screen of the tablet computer 200. It may be understood that, in this embodiment of this application, that the user controls the target area to perform zoom transformation may be an operation performed by the user based on a location of the key handle relative to the target area. This is not limited in this application.

Refer to some interface changes shown in FIG. 5G and FIG. 5H. In some embodiments, the user may operate the target area and control the target area to perform translation transformation.

After the user operates the touch control screen of the tablet computer 200 in the box selection mode to perform the box selection operation, the tablet computer 200 displays the lasso trajectory and the key handle on the touch control screen of the tablet computer 200. As shown in FIG. 5G, the lasso trajectory 503 and the key handle 507 are displayed on the touch control screen of the tablet computer 200, and an area box-selected by the lasso trajectory 503 is the target area. After the user operates the target area on the touch control screen of the tablet computer 200 to slide toward a right edge of the tablet computer 200, that is, performs an operation ④ in FIG. 5G, an interface shown in FIG. 5H may be displayed on the touch control screen of the tablet computer 200.

Still referring to FIG. 5H, an operation in which the user operates the target area to slide toward the right edge of the tablet computer 200 is controlling translation transformation of the target area for rightward translation, and the key handle 507 and the lasso trajectory 503 translate rightward with the target area. Relative locations of the key handle 507, the lasso trajectory 503, and the target area remain unchanged. Specifically, when the user performs the operation ④, the tablet computer 200 controls the key handle 507 and the lasso trajectory 503 to follow a translation trajectory of the operation ④ of the user to translate by a corresponding distance.

It may be understood that when the user operates the target area to slide toward the right edge of the tablet computer 200, the tablet computer 200 may control the target area to translate by the corresponding distance along the translation trajectory of the operation ④ of the user. A translation distance is proportional to a sliding distance of the operation ④ performed by the user.

Refer to some interface changes shown in FIG. 5I and FIG. 5J. In some embodiments, the user may operate a canvas in which the key handle, the lasso trajectory, and the target area are located to slide upward and downward.

After the user operates the touch control screen of the tablet computer 200 in the box selection mode to perform the box selection operation, the tablet computer 200 may display the lasso trajectory and the key handle on the touch control screen of the tablet computer 200. As shown in FIG. 5I, the lasso trajectory 503 and the key handle 507 are displayed on the touch control screen of the tablet computer 200, and an area box-selected by the lasso trajectory 503 is the target area. After the user operates a move button 508 of the canvas on the touch control screen of the tablet computer 200 to slide upward, that is, performs an operation ⑤ in FIG. 5I, an interface shown in FIG. 5J may be displayed on the touch control screen of the tablet computer 200.

Still referring to FIG. 5I, an operation in which the user operates the move button 508 of the canvas on the touch control screen of the tablet computer 200 to slide upward is an operation of controlling movement of the canvas, and the key handle 507, the lasso trajectory 503, and the target area are relatively changed with translation of the canvas. Relative locations of the key handle 507, the lasso trajectory 503, and the target area remain unchanged.

For a relative change, for example, when the move button 508 controlling the canvas slides upward by a specific distance, the key handle 507, the lasso trajectory 503, and the target area slide downward by a specific distance on the touch control screen of the tablet computer 200.

It may be understood that when the canvas is controlled to translate, relative locations of the canvas and each of the key handle 507, the lasso trajectory 503, and the target area remain unchanged.

Refer to some interface changes shown in FIG. 5K to FIG. 5R. In some embodiments, stability of the key handle can also be ensured when the user operates the tablet computer 200 in different modes.

After the user operates the touch control screen of the tablet computer 200 in the box selection mode to perform the box selection operation, the tablet computer 200 may display the lasso trajectory and the key handle on the touch control screen of the tablet computer 200. The interface shown in FIG. 2B may be displayed on the touch control screen of the tablet computer 200.

After the user performs a split-screen operation on the interface shown in FIG. 2B, the tablet computer 200 enters a split-screen window mode. In this case, a left window of the display interface of the tablet computer 200 displays a memo window 521, and a right window displays a desktop window 522, as shown in FIG. 5K. The memo window 521 includes the target area, the key handle 507, and the lasso trajectory 503.

It may be understood that, in the split-screen window mode, in comparison with the display interface shown in FIG. 2B, the memo window 521 in FIG. 5K is zoomed-out to ½ of an original size. In this case, the target area, the key handle 507, and the lasso trajectory 503 are also zoomed-out to ½ of the original size. In addition, relative locations of the target area, the key handle 507, and the lasso trajectory 503 remain unchanged.

It may be understood that, in some embodiments, when the user operates the key handle 507 or the target area in FIG. 5K in the split-screen window mode to control the target area to change, the relative locations of the target area, the key handle 507, and the lasso trajectory 503 remain unchanged. For example, when the user performs the rotation operation in FIG. 5C on the interface shown in FIG. 5K, the relative locations of the target area, the key handle 507, and the lasso trajectory 503 remain unchanged. In this case, the tablet computer 200 displays an interface shown in FIG. 5L.

After the user performs a floating window operation on the interface shown in FIG. 2B, the tablet computer 200 enters a floating window mode. In this case, the display interface of the tablet computer 200 displays a desktop window 531 in full screen, and a memo window 532 floats over the desktop window 531 in a form of a floating window; as shown in FIG. 5M. The memo window 532 includes the target area, the key handle 507, and the lasso trajectory 503.

It may be understood that, in the floating window mode, in comparison with the display interface shown in FIG. 2B, the memo window 532 in FIG. 5M is zoomed-out by a specific percentage. In this case, the target area, the key handle 507, and the lasso trajectory 503 are also zoomed-out by a corresponding percentage. In addition, relative locations of the target area, the key handle 507, and the lasso trajectory 503 remain unchanged.

It may be understood that, in some embodiments, when the user operates the key handle 507 or the target area in the floating window mode to control the target area to change, the relative locations of the target area, the key handle 507, and the lasso trajectory 503 remain unchanged. For example, when the user performs the rotation operation in FIG. 5C on the interface shown in FIG. 5M, the relative locations of the target area, the key handle 507, and the lasso trajectory 503 remain unchanged. In this case, the tablet computer 200 displays an interface shown in FIG. 5N.

In some embodiments, in a split-screen window mode, the user opens a memo window 541 and a memo window 542. A left window of the display interface of the tablet computer 200 displays the memo window 541, and a right window displays the memo window 542. The memo window 541 includes the target area, the key handle 507, and the lasso trajectory 503, and the memo window 542 includes the graphic 511, the key handle 517, and the lasso trajectory 514, as shown in FIG. 5O and FIG. 5Q.

It may be understood that, in some embodiments, when the user operates the key handle or the target area in the split-screen window mode to change, relative locations of the target area, the key handle, and the lasso trajectory remain unchanged. For example, when the user performs the rotation operation in FIG. 5C on the interface shown in FIG. 5O, the relative locations of the target area, the key handle 507, and the lasso trajectory 503 remain unchanged. In this case, the tablet computer 200 displays an interface shown in FIG. 5P. For another example, when the user performs the rotation operation in FIG. 5C on the interface shown in FIG. 5Q, the relative locations of the graphic 511, the key handle 517, and the lasso trajectory 514 remain unchanged. In this case, the tablet computer 200 displays an interface shown in FIG. 5R.

It may be understood that, according to the display control method provided in Embodiment 1, the key handle can be determined on the lasso trajectory on a visual interface of the electronic device. In addition, in different control scenarios of the electronic device, the relative locations and relative sizes of the key handle and the lasso trajectory remain unchanged, so that the key handle is attached to the lasso trajectory. In addition, stability of the key handle in different scenarios is ensured, which can improve visual perception of the user, and help improve user experience.

The following further describes in detail another key handle determining method in this application with reference to the scenario diagram shown in FIG. 1A and FIG. 1B and the system structural diagram shown in FIG. 2A and FIG. 2B.

Embodiment 2

The following describes in detail a specific process in which the tablet computer 200 implements the display control method in this embodiment of this application with reference to a flowchart and schematic diagrams of related interfaces.

Figure 6:
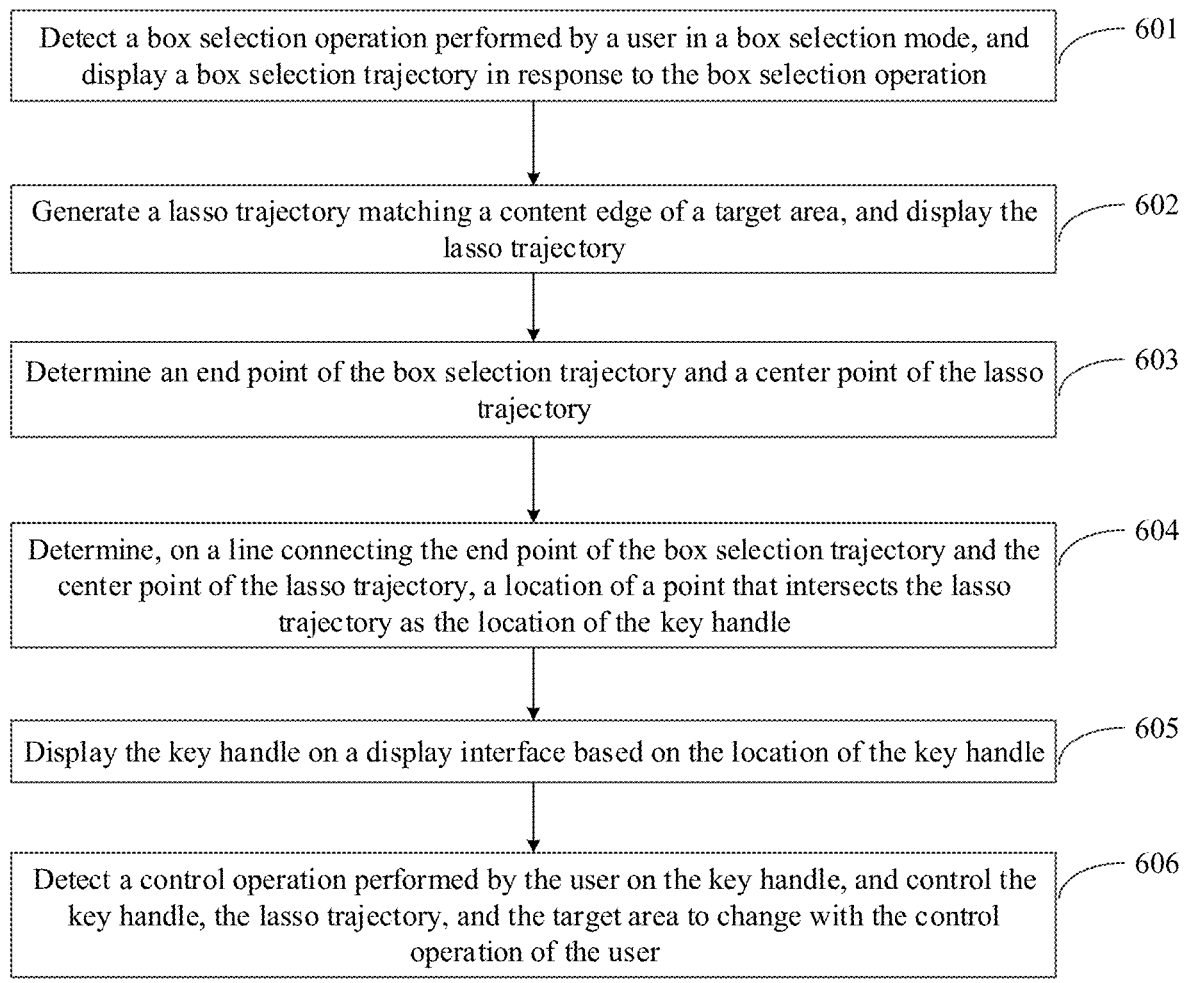
FIG. 6 is a schematic flowchart of an example of implementing another display control method according to some embodiments of this application.

FIG. 6 is a schematic flowchart of a display control method according to an embodiment of this application. In this embodiment of this application, an execution body of each step shown in FIG. 6 is the tablet computer 200. To avoid repeated description, the following does not describe the execution body of each step when describing execution content of each step.

As shown in FIG. 6, this procedure includes the following steps.

601: Detect a box selection operation performed by a user in a box selection mode, and display a box selection trajectory in response to the box selection operation. Step 601 is the same as step 401. Details are not described herein again.

602: Generate a lasso trajectory matching a content edge of an area box-selected by the box selection trajectory, and display the lasso trajectory. Step 602 is the same as step 402. Details are not described herein again.

603: Determine an end point of the box selection trajectory and a center point of the lasso trajectory.

It may be understood that a difference between step 603 and step 403 lies in that locations of points obtained on the box selection trajectory are different. The end point of the box selection trajectory is obtained in step 603, but the start point of the box selection trajectory is obtained in step 403. It may be understood that, after the user performs the box selection operation, the start point and the end point of the box selection trajectory are both located on the display interface of the tablet computer 200, so that a location of a key handle can be easily determined. For details, refer to related descriptions in step 403. Details are not described herein again.

604: Determine, on a line connecting the end point of the box selection trajectory and the center point of the lasso trajectory, a location of a point that intersects the lasso trajectory as the location of the key handle.

It may be understood that a difference between step 604 and step 404 lies in that conditions for determining the location of the key handle are different, but the key handle determining method is the same. For details, refer to related descriptions in step 404. Details are not described herein again.

605: Display the key handle on the display interface based on the location of the key handle. Step 605 is the same as step 405. Details are not described herein again.

606: Detect a control operation performed by the user on the key handle, and control the key handle, the lasso trajectory, and the area box-selected by the lasso trajectory to change with the control operation of the user. Step 606 is the same as step 406. Details are not described herein again.

Figure 7:
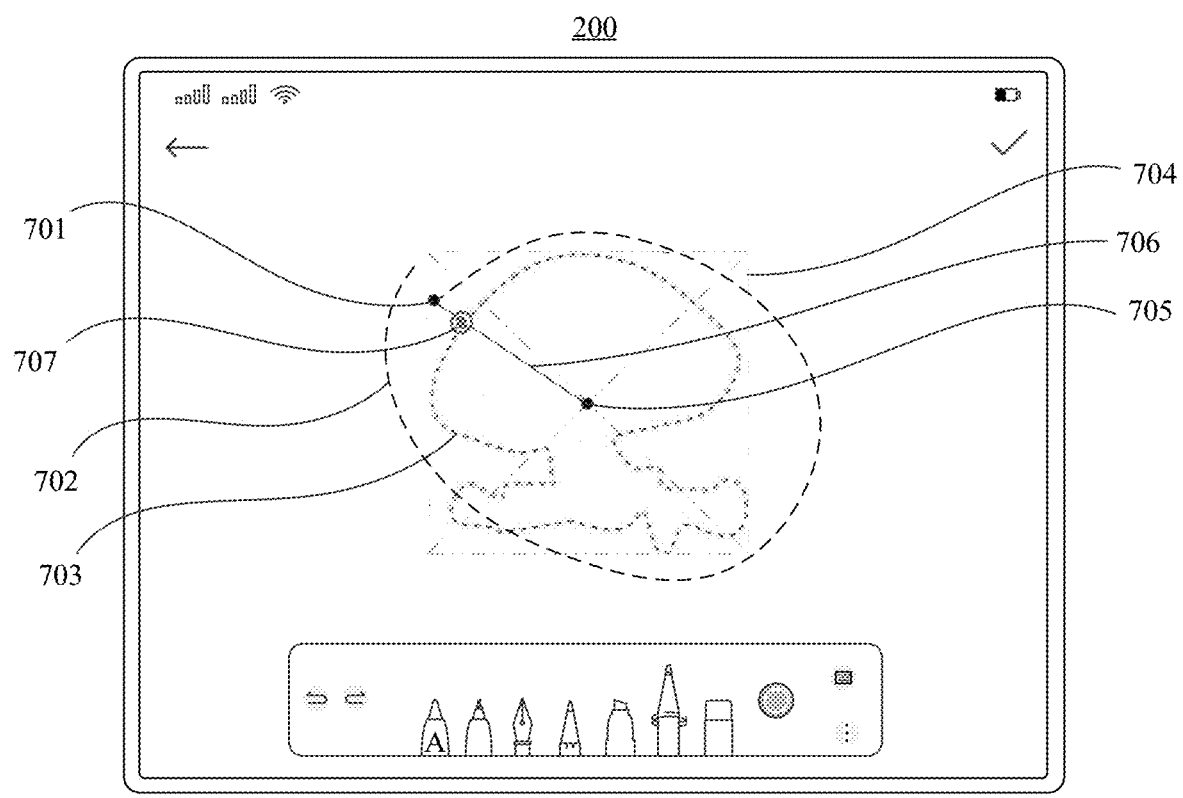
FIG. 7 is a schematic diagram of an example of an interface of a key handle determining process according to some embodiments of this application.

For example, FIG. 7 is a diagram of an interface of a method for determining a location of a key handle according to Embodiment 2. The following describes the method for determining a location of a key handle in this embodiment with reference to FIG. 7.

The user operates the touch control screen of the tablet computer 200 to complete the box selection operation and generate the box selection trajectory and the lasso trajectory, that is, to perform step 601 and step 602. For details, refer to related descriptions in FIG. 2A and FIG. 2B. Details are not described herein again.

As shown in FIG. 7, after performing step 601 and step 602, the tablet computer 200 generates a box selection trajectory 702 and a lasso trajectory 703. The tablet computer 200 may obtain coordinates of a first touch location generated when the user performs the box selection operation, namely, an end point 701 of the box selection trajectory (which is referred to as an end point location 701 hereinafter). The tablet computer 200 may determine, based on location coordinates of the lasso trajectory 703 generated in step 602, four extreme values that are in a direction of an x-axis and a direction of a y-axis that are of the location coordinates of the lasso trajectory 703, and obtain a rectangular area 704 based on the four extreme values. The tablet computer 200 calculates a center point 705 of the rectangular area 504, and uses the calculated center point 705 as a center point of an area box-selected by the lasso trajectory 703. The center point of the rectangular area 704 is an intersection point of two diagonal lines of the rectangular area 704.

Still referring to FIG. 5A, after obtaining the end point location 701 and the center point 705 of a target area, the tablet computer 200 may determine a straight line 706 connecting the end point location 701 and the center point 705. The tablet computer 200 may determine that the straight line 706 and the lasso trajectory 703 intersect at a point 707, and a location of the point 707 is the location of the key handle.

It may be understood that the end point location 701 and the center point 705 that are obtained by the tablet computer 200 may be represented as coordinates of two locations, the straight line 706 determined based on the end point location 701 and the center point 705 may be represented as a function, and a location of a key handle 707 may be represented as coordinates. In other words, when performing step 604, the tablet computer does not need to simulate and render the interface diagram shown in FIG. 7, but determines coordinates of the handle 707 by obtaining coordinates of the end point location 701 and the center point 705 and a function of the straight line 706.

The foregoing separately describes different key handle determining methods in the technical solutions in this application by using Embodiment 1 and Embodiment 2 and an example in which the electronic device 200 is a tablet computer. The following, by still using the tablet computer 100 as an example, summarizes the display control method provided in this application based on analysis and introduction of the foregoing embodiments.

Figure 8:
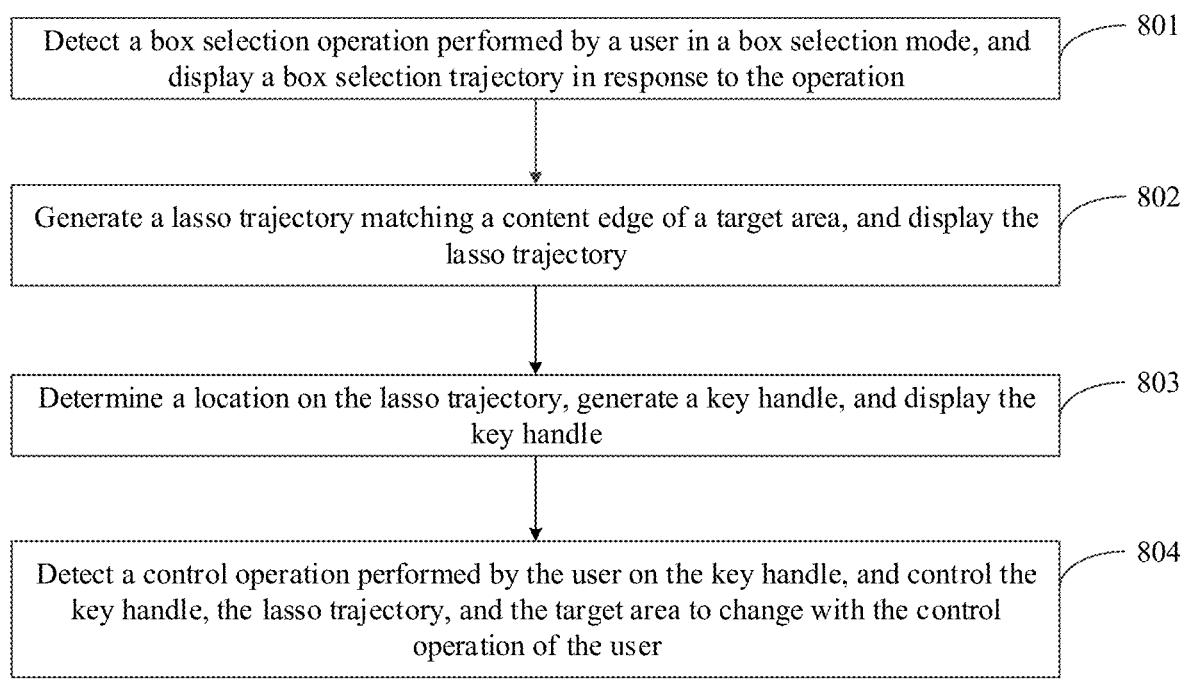
FIG. 8 is a schematic flowchart of an example of implementing a display control method provided in an embodiment of this application according to some embodiments of this application.

Specifically, FIG. 8 is a flowchart of a display control method according to this application.

As shown in FIG. 8, this procedure includes the following steps.

801: Detect a box selection operation performed by a user in a box selection mode, and display a box selection trajectory in response to the operation. Step 801 is the same as step 401. Details are not described herein again.

802: Generate a lasso trajectory matching a content edge of an area box-selected by the box selection trajectory, and display the lasso trajectory. Step 802 is the same as step 402. Details are not described herein again.

803: Determine a location on the lasso trajectory, generate a key handle, and display the key handle.

It may be understood that, in some embodiments, the location determined on the lasso trajectory may be the location of the key handle determined according to the methods in Embodiment 1 and Embodiment 2. In some embodiments, another location on the lasso trajectory may alternatively be determined as that of the key handle. For example, a location of a point that is on the lasso trajectory and that is closest to a start point or an end point of the box selection trajectory is determined as the location of the key handle. For example, a location of an intersection point is determined as the location of the key handle, where the intersection point is closest to a center point of the lasso trajectory and is in a plurality of intersection points of the lasso trajectory and a straight line connecting the center point of the lasso trajectory and a start point or an end point of the box selection trajectory.

It may be understood that the key handle determining method in this embodiment of this application is not limited to the foregoing Embodiment 1 and Embodiment 2. An objective of this application is to determine a location of a point on the lasso trajectory as the location of the key handle, and a determined point is located on the display interface of the tablet computer 200, so that the location of the key handle is attached to the lasso trajectory. Therefore, the display interface of the tablet computer 200 in the box selection mode is optimized, and visual perception and use experience of the user are improved.

804: Detect a control operation performed by the user on the key handle, and control the key handle, the lasso trajectory, and the area box-selected by the lasso trajectory to change with the control operation of the user. Step 804 is the same as step 405. Details are not described herein again.

Figure 9:
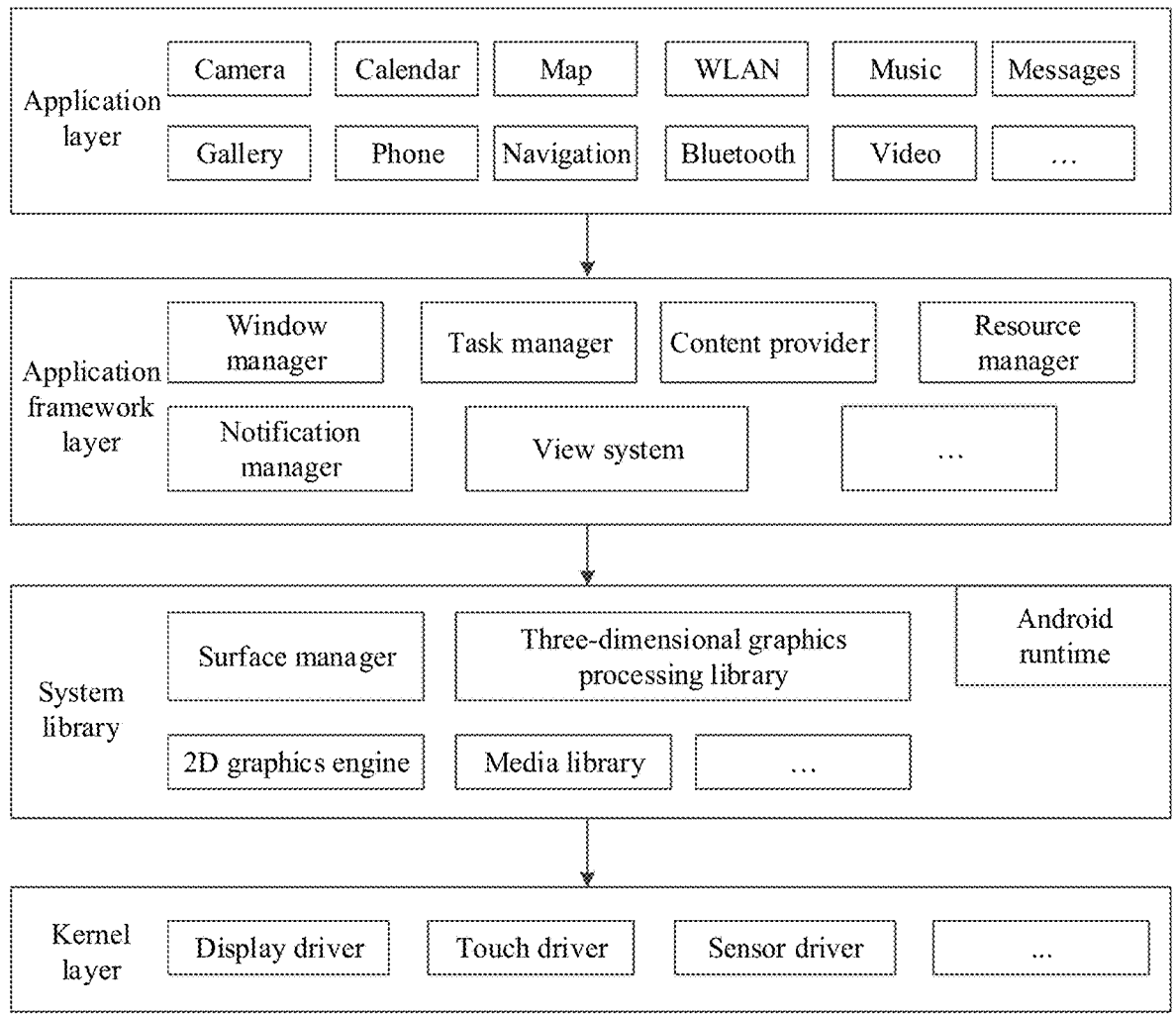
FIG. 9 is a block diagram of an example of a software structure of an electronic device 200 according to some embodiment of this application.

FIG. 9 is a block diagram of a software structure of an electronic device 200 according to an embodiment of this application.

A software system of the electronic device 200 may use a layered architecture, an event-driven architecture, a microkernel architecture, a microservice architecture, or a cloud architecture. In embodiments of this application, an Android system with a layered architecture is used as an example to describe the software structure of the electronic device 200.

FIG. 9 is a block diagram of a software structure of an electronic device 200 according to an embodiment of this application.

The layered architecture divides software into several layers, and each layer has a clear role and task. The layers communicate with each other through a software interface. In some embodiments, the Android system is divided into four layers, which are respectively an application layer, an application framework layer, an Android runtime and a system library, and a kernel layer from top to down.

The application layer may include a series of application packages.

As shown in FIG. 9, the application packages may include applications such as Camera, Gallery, Calendar, Phone, Map, Navigation, WLAN, Bluetooth, Music, Video, and Messages.

The application framework layer provides an application programming interface (API) and a programming framework for applications in the application layer. The application framework layer includes some predefined functions.

As shown in FIG. 9, the application framework layer may include a window manager, a task manager, a phone manager, a resource manager, a notification manager, a view system, an optical character recognizer, and the like.

The window manager is configured to manage a window program. The window manager may obtain a size of a display, determine whether there is a status bar, lock the screen, take a screenshot, and the like. In this embodiment of this application, the window manager may obtain a touch event corresponding to a box selection operation of a user, including image information, text information, and the like in an original window; to match a corresponding display task and display a corresponding interface, for example, display the box selection trajectory described in step 401, display the lasso trajectory described in step 402, or display the key handle described in step 404. For details, refer to related descriptions in step 401, step 402, or step 404. Details are not described herein again.

The task manager is configured to cooperate with the window manager to retrieve task content corresponding to a sliding operation of the user, for example, a display task that needs to be controlled and executed by the window manager. After retrieving content of a corresponding display task, the task manager sends the content of the corresponding display task to the window manager for execution, to implement a process in which the electronic device 200 displays the corresponding interface.

A content provider is configured to store and obtain data, and enable the data to be accessible by an application. The data may include videos, images, audio, calls that are made and answered, browsing histories and bookmarks, address books, and the like.

The resource manager provides various resources for an application, such as a localized string, an icon, a picture, a layout file, and a video file.

The notification manager enables an application to display notification information in the status bar, and may be configured to convey a message of a notification type, where the displayed notification information may automatically disappear after a short stay without user interaction. For example, the notification manager is configured to notify download completion, provide a message notification, and the like. The notification manager may alternatively be a notification that appears in a top status bar of a system in a form of a graph or scroll bar text, for example, a notification of an application running in the background or a notification that appears on a screen in a form of a dialog window: For example, text information is prompted on the status bar, an alert sound is made, the electronic device vibrates, and an indicator light flashes.

The view system includes visual controls, for example, a control for displaying text and a control for displaying a picture. The view system may be configured to build an application. A display interface may include one or more views. For example, a display interface including an SMS notification icon may include a view for displaying text and a view for displaying a picture.

The Android runtime includes a core library and a virtual machine. The Android runtime is responsible for scheduling and management of the Android system.

The kernel library includes two parts: a functional function that needs to be invoked by a java language, and a kernel library of Android.

The application layer and the application framework layer are run on the virtual machine. The virtual machine executes java files at the application layer and the application framework layer as binary files. The virtual machine is used to perform functions such as object lifecycle management, stack management, thread management, security and exception management, and garbage collection.

The system library may include a plurality of functional modules, for example, a surface manager, a media library (Media Libraries), a three-dimensional graphics processing library (for example, OpenGL ES), and a 2D graphics engine (for example, SGL).

The surface manager is used to manage a display subsystem, and provide 2D and 3D layer fusion for a plurality of applications.

The media library supports playback and recording in a plurality of common audio and video formats, a static image file, and the like. The media library may support a plurality of audio and video coding formats, for example, MPEG4, H.264, MP3, AAC, AMR, JPG, and PNG.

The three-dimensional graphics processing library is used to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a touch driver, and a sensor driver.

With reference to a scenario from capturing an operation of sliding upward to switching to a box selection mode window; the following describes an example working procedure of software and hardware of the electronic device 200.

When the touch sensor 180K receives a touch operation, a corresponding hardware interruption is sent to the kernel layer. The kernel layer processes the touch operation into an original input event (including touch coordinates, a timestamp of the touch operation, and other information). The original input event is stored at the kernel layer. The application framework layer obtains the original input event from the kernel layer, and identifies a control corresponding to the input event. For example, the touch operation is an operation of tapping a lasso tool, and an object window corresponding to the operation of tapping the lasso tool is a memo window: A memo invokes an interface of the application framework layer, and the memo is enabled. Then, the display driver is enabled by invoking the kernel layer, and the memo window in the box selection mode is displayed by using the display 190.

A reference to "an embodiment" or "embodiments" in the specification means that specific features, structures, or characteristics described with reference to the embodiment is included in at least one example implementation solution or technology disclosed according to this application. The phrase "in an embodiment" in parts of the specification does not necessarily refer to a same embodiment.

Disclosure in this application further relates to an apparatus configured to perform operations in the text. The apparatus may be specially constructed for a required purpose, or may include a general-purpose computer that is selectively activated or reconfigured by a computer program stored in the computer. Such a computer program may be stored in a computer-readable medium, for example, but is not limited to any type of disk, including a floppy disk, an optical disc, a CD-ROM, a magneto-optical disk, a read-only memory (ROM), a random access memory (RAM), an EPROM, an EEPROM, a magnetic or optical card, an application-specific integrated circuit (ASIC), or any type of medium suitable for storing electronic instructions, and each of the disks may be coupled to a computer system bus. In addition, the computer mentioned in the specification may include a single processor or may be an architecture related to a plurality of processors that use an increased computing capability.

In addition, the language used in the specification has been primarily selected for readability and guidance purposes and may not be selected to describe or limit the disclosed subject matter. Therefore, disclosure in this application is intended to describe rather than limit the area of the concept discussed in this specification.

What is claimed is:

1. A display control method, comprising:
    displaying, by an electronic device, a first interface;
    in response to a first operation of a user on the first interface, displaying, by the electronic device, a first trajectory corresponding to the first operation, wherein the first trajectory surrounds at least a part of a first target;
    in response to ending the first operation by the user, converting, by the electronic device, the first trajectory into a second trajectory, displaying the second trajectory, and displaying a first control on the second trajectory, wherein the second trajectory is determined based on an edge of the first target, and the first target is located in the second trajectory; and
    in response to a second operation performed by the user on the first control on the first interface, changing, by the electronic device, the second trajectory and the first target in the second trajectory.

2. The display control method according to claim 1, wherein the changing the second trajectory and the first target in the second trajectory comprises at least one of zoom transformation, translation transformation, and rotation transformation.

3. The display control method according to claim 1, further comprising:
    in a process of changing the second trajectory, the first control is stationary relative to the second trajectory.

4. The display control method according to claim 1,
    wherein a display location of the first control on the second trajectory is a first intersection point of a first connection line and the second trajectory; and
    wherein the first connection line is a straight line connecting a center point of the second trajectory and a start point of the first trajectory, and the first intersection point is an intersection point that is closest to the start point of the first trajectory and that is in intersection points of the first connection line and the second trajectory.

5. The display control method according to claim 1,
    wherein a display location of the first control on the second trajectory is a second intersection point of a second connection line and the second trajectory; and
    wherein the second connection line is a straight line connecting a center point of the second trajectory and an end point of the first trajectory, and the second intersection point is an intersection point that is closest to the end point of the first trajectory and that is in intersection points of the second connection line and the second trajectory.

6. The display control method according to claim 1, wherein the first interface comprises a first window of a first application, the method further comprising:
    changing from the first interface to a second interface in response to a third operation of the user on the first interface, wherein the second interface comprises a second window;
    wherein the second window is generated by adjusting the first window based on a display percentage, and the second window displays a second target, a third trajectory, and a second control.

7. The display control method according to claim 6, wherein the second target, the third trajectory, and the second control are generated by adjusting the first target, the second trajectory, and the first control based on the display percentage, and relative locations of the second target, the third trajectory, and the second control remain unchanged.

8. The display control method according to claim 6, wherein the third operation comprises a split-screen operation or a floating window operation.

9. The display control method according to claim 6, wherein the second interface further comprises a third window, and the method further comprises:
    in response to a fourth operation of the user in the second window, changing the second control, the third trajectory, and the second target in the third trajectory, wherein the third window remains stationary.

10. The display control method according to claim 6, wherein the first application is a memo, an electronic note application, an electronic document application, or an electronic graphics processing application.

11. The display control method according to claim 10, wherein the first application is a memo, and wherein a lasso tool on the first interface is in an enabled state.

12. The display control method according to claim 1, wherein the first operation is a box selection operation of the user, and the first trajectory is a box selection trajectory displayed by the electronic device on a screen of the electronic device corresponding to the box selection operation.

13. The display control method according to claim 1, wherein the first control is a key handle that controls the first target.

14. An electronic device, comprising:
a display;
one or more processors; and
one or more memories coupled to the one or more processors, the one or more memories configured to store instructions that, when executed by one or more processors, cause the electronic device to be configured to:
display a first interface;
in response to a first operation of a user on the first interface, display a first trajectory corresponding to the first operation, wherein the first trajectory surrounds at least a part of a first target;
in response to ending the first operation by the user, convert the first trajectory into a second trajectory, displaying the second trajectory, and displaying a first control on the second trajectory, wherein the second trajectory is determined based on an edge of the first target, and the first target is located in the second trajectory; and
in response to a second operation performed by the user on the first control on the first interface, change the second trajectory and the first target in the second trajectory.

15. The electronic device according to claim 14, wherein the changing the second trajectory and the first target in the second trajectory comprises at least one of zoom transformation, translation transformation, and rotation transformation.

16. The electronic device according to claim 14, wherein when the one or more processors execute the instructions, the electronic device is further configured to:
in a process of changing the second trajectory, the first control is stationary relative to the second trajectory.

17. The electronic device according to claim 14,
wherein a display location of the first control on the second trajectory is a first intersection point of a first connection line and the second trajectory; and
wherein the first connection line is a straight line connecting a center point of the second trajectory and a start point of the first trajectory, and the first intersection point is an intersection point that is closest to the start point of the first trajectory and that is in intersection points of the first connection line and the second trajectory.

18. The electronic device according to claim 14,
wherein a display location of the first control on the second trajectory is a second intersection point of a second connection line and the second trajectory; and
wherein the second connection line is a straight line connecting a center point of the second trajectory and an end point of the first trajectory, and the second intersection point is an intersection point that is closest to the end point of the first trajectory and that is in intersection points of the second connection line and the second trajectory.

19. The electronic device according to claim 14, wherein the first interface comprises a first window of a first application, and when the one or more processors execute the instructions, the electronic device is further configured to:
change from the first interface to a second interface in response to a third operation of the user on the first interface, wherein the second interface comprises a second window;
wherein the second window is generated by adjusting the first window based on a display percentage, and the second window displays a second target, a third trajectory, and a second control.

20. A non-transitory computer-readable storage medium, wherein the computer-readable storage medium stores instructions, and when the instructions are executed on a computer, the computer is enabled to perform:
displaying a first interface;
in response to a first operation of a user on the first interface, displaying a first trajectory corresponding to the first operation, wherein the first trajectory surrounds at least a part of a first target;
in response to ending the first operation by the user, converting the first trajectory into a second trajectory, displaying the second trajectory, and displaying a first control on the second trajectory, wherein the second trajectory is determined based on an edge of the first target, and the first target is located in the second trajectory; and
in response to a second operation performed by the user on the first control on the first interface, changing the second trajectory and the first target in the second trajectory.

* * * * *